United States Patent
Misawa et al.

(10) Patent No.: US 10,778,892 B2
(45) Date of Patent: Sep. 15, 2020

(54) CAMERA, SETTING METHOD OF CAMERA, AND SETTING PROGRAM OF CAMERA

(71) Applicant: FUJIFILM Corporation, Tokyo (JP)

(72) Inventors: Atsushi Misawa, Saitama (JP); Kentaro Tokiwa, Saitama (JP); Hirofumi Horii, Saitama (JP); Yuichi Fujimura, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/395,856

(22) Filed: Apr. 26, 2019

(65) Prior Publication Data
US 2019/0253628 A1    Aug. 15, 2019

Related U.S. Application Data

(63) Continuation of application No. PCT/JP2017/034161, filed on Sep. 21, 2017.

(30) Foreign Application Priority Data

Nov. 15, 2016 (JP) .................................. 2016-222394

(51) Int. Cl.
*H04N 5/232* (2006.01)
*H04N 5/225* (2006.01)
(Continued)

(52) U.S. Cl.
CPC ......... *H04N 5/23245* (2013.01); *G03B 17/02* (2013.01); *G03B 17/18* (2013.01);
(Continued)

(58) Field of Classification Search
CPC .... H04N 5/225; H04N 5/232; H04N 5/23216; H04N 5/23245; H04N 5/37452;
(Continued)

(56) References Cited

U.S. PATENT DOCUMENTS

| 6,067,424 A * | 5/2000 | Shono ..................... G03B 17/00 |
| | | 396/297 |
| 2002/0196357 A1* | 12/2002 | Battles ............... H04N 5/23293 |
| | | 348/333.1 |

(Continued)

FOREIGN PATENT DOCUMENTS

| DE | 112013002667 T5 | 3/2015 |
| JP | 2006-270332 A | 10/2006 |

(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2017/034161, dated May 31, 2019, with English translation.
International Search Report (Form PCT/ISA/210) for International Application No. PCT/JP2017/034161, dated Dec. 5, 2017, with English translation.
German Office Action, dated Mar. 23, 2020, for corresponding German Application No. 112017005748.5, with an English translation.
Machine translation of JP-2008-165118-A, published on Jul. 17, 2008.

*Primary Examiner* — Marly S Camargo
(74) *Attorney, Agent, or Firm* — Birch, Stewart, Kolasch & Birch, LLP

(57) ABSTRACT

Provided are a camera having a compact configuration and high operability, a setting method of the camera, and a setting program of the camera. A touch sensor 130 is provided on a top surface of an operation dial 110. In a case where the top surface of the operation dial 110 is touched, an exposure mode of the camera is switched according to a touched region on the top surface. An operation target of the operation dial 110 is set according to the set exposure mode.

19 Claims, 19 Drawing Sheets

(51) Int. Cl.
*H04N 5/374* (2011.01)
*H04N 1/00* (2006.01)
*G03B 17/02* (2006.01)
*G03B 19/08* (2006.01)
*G03B 7/00* (2014.01)
*G03B 17/18* (2006.01)
*G06F 3/041* (2006.01)
*G06F 9/30* (2018.01)
*H04N 5/3745* (2011.01)

(52) U.S. Cl.
CPC .......... *G06F 3/0416* (2013.01); *G06F 9/3004* (2013.01); *H04N 5/225* (2013.01); *H04N 5/232* (2013.01); *H04N 5/23216* (2013.01); *H04N 5/37452* (2013.01)

(58) Field of Classification Search
CPC .......... H04N 1/00387; H04N 1/00384; H04N 1/00397; H04N 2201/00; H04N 2201/0084; G03B 9/08; G03B 7/14; G03B 7/0805; G03B 17/02; G03B 9/64; G03B 9/304; G06F 3/0416
USPC .... 348/376, 208.12, 221.1, 229.1, 362, 199, 348/252, 296, 367, 585; 396/169, 246, 396/212, 238; 382/115, 116, 124, 126
See application file for complete search history.

(56) References Cited

U.S. PATENT DOCUMENTS

| | | | | |
|---|---|---|---|---|
| 2008/0025574 | A1* | 1/2008 | Morikawa | H04N 5/23225 382/115 |
| 2012/0146818 | A1* | 6/2012 | Degawa | G03B 7/02 341/35 |
| 2015/0124116 | A1* | 5/2015 | Nakajima | H04N 5/23216 348/373 |
| 2015/0149945 | A1 | 5/2015 | Izaki | |
| 2020/0007788 | A1* | 1/2020 | Miyajima | H04N 5/23216 348/223.1 |

FOREIGN PATENT DOCUMENTS

| | | |
|---|---|---|
| JP | 2008-78045 A | 4/2008 |
| JP | 2008-165118 A | 7/2008 |
| JP | 2010-192223 A | 9/2010 |
| JP | 2014-161066 A | 9/2014 |
| JP | 2014-202837 A | 10/2014 |
| JP | 2016-133692 A | 7/2016 |

* cited by examiner

CAMERA, SETTING METHOD OF CAMERA, AND SETTING PROGRAM OF CAMERA

CROSS-REFERENCE TO RELATED APPLICATIONS

This application is a Continuation of PCT International Application No. PCT/JP2017/034161 filed on Sep. 21, 2017, which claims priority under 35 U.S.C § 119(a) to Japanese Patent Application No. 2016-222394 filed on Nov. 15, 2016. Each of the above application(s) is hereby expressly incorporated by reference, in its entirety, into the present application.

BACKGROUND OF THE INVENTION

1. Field of the Invention

The present invention relates to a camera, a setting method of the camera, and a setting program of the camera.

2. Description of the Related Art

A camera in which an exposure mode can be selected is known. The exposure mode is divided into each mode depending on which element of an F-number and a shutter speed is controlled by a user in order to decide an exposure. The generally employed exposure mode is a program mode, a shutter speed priority mode, an aperture priority mode, and a manual mode.

The program mode is a mode in which the camera automatically decides the F-number and the shutter speed so as to achieve a proper exposure. The program mode is also referred to as a P mode (P: program), program auto, or the like. In the program mode, the user can change a combination of the F-number and the shutter speed while the exposure is constantly maintained. This is referred to as program shift.

The shutter speed priority mode is a mode in which the camera automatically decides an F-number such that the proper exposure is achieved for a shutter speed selected by the user. The shutter speed priority mode is also referred to as an S mode (S: shutter), a Tv mode (Tv: time value), shutter speed priority auto, or the like.

The aperture priority mode is a mode in which the camera automatically decides a shutter speed such that the proper exposure is achieved for an F-number selected by the user. The aperture priority mode is also referred to as an A mode (A: aperture), an Av mode (Av: aperture value), aperture priority auto, or the like.

The manual mode is a mode in which the user selects both the F-number and the shutter speed. The manual mode is also referred to as an M mode (M: manual) or the like.

In the related art, the selection of the exposure mode is performed by a mode dial provided in a camera body (for example, JP2006-270332A, JP 2016-133692A, and the like). Alternatively, the selection of the exposure mode is performed on a menu screen or the like by using a monitor provided on the back surface of the camera body (for example, JP 2014-161066A and the like).

SUMMARY OF THE INVENTION

However, it is necessary to provide the mode dial in the camera body for the setting by the mode dial. Therefore, there are disadvantages that the number of components increases and the size of the camera body increases.

Further, the operation for the setting by using the menu screen or the like is complicated. Therefore, there is a disadvantage that it is impossible to quickly set a target mode.

The invention has been made in consideration of the above-mentioned circumstances, and an object of the invention is to provide a camera having a compact configuration and high operability, a setting method of the camera, and a setting program of the camera.

Means for achieving the above-mentioned object are as follows.

(1) A camera comprising:
a rotary operation dial;
a contact detection unit that detects contact of a finger with a top surface of the operation dial and a contact position of the finger on the top surface of the operation dial;
a first storage unit that stores information on a mode to be set in a case where the contact is detected by the contact detection unit and stores the information on the mode to be set for each of a plurality of regions set on the top surface of the operation dial;
a mode setting unit that sets the mode based on the information stored in the first storage unit and a detection result of the contact detection unit;
a second storage unit that stores information in which an operation target of the operation dial is set for each mode; and
an operation target setting unit that sets the operation target of the operation dial based on the information stored in the second storage unit and the mode set by the mode setting unit.

According to the embodiment, in the case where the top surface of the operation dial is touched by the finger, the mode of the camera is switched according to the touched position. The mode to be set is set for each region, for example, by dividing the top surface of the operation dial into the plurality of regions. Accordingly, it is possible to quickly switch the mode. Further, according to the embodiment, the operation target of the operation dial is switched in conjunction with the switching of the mode. The operation target is a main setting item in each mode. For example, in a case where the switching of the exposure mode is possible, the operation target is program shift in a case of a program mode, the operation target is a shutter speed in a case of a shutter speed priority mode, the operation target is an F-number in a case of an aperture priority mode, and the operation target is the shutter speed or the F-number in a case of a manual mode. Accordingly, it is possible to provide good operability.

(2) The camera according to (1),
wherein the contact detection unit further detects a movement and a movement direction of the finger whose contact is detected, and
wherein the first storage unit further stores information on a mode to be set in a case where the movement of the finger is detected and stores the information on the mode to be set for each movement direction.

According to the embodiment, in the case where the finger touching the top surface of the operation dial is moved, the mode of the camera is switched according to the movement direction of the finger in addition to switching the mode of the camera according to the touched position. Accordingly, a type of switchable mode increases. For example, the movement from the front to the rear, the movement from the rear to the front, the movement from the right to the left, the movement from the left to the right, and the like are detected as the movement direction.

(3) A camera comprising:

a rotary operation dial;

a contact detection unit that detects a movement and a movement direction of a finger touching a top surface of the operation dial;

a first storage unit that stores information on a mode to be set in a case where the movement of the finger is detected by the contact detection unit and stores the information on the mode to be set for each movement direction;

a mode setting unit that sets the mode based on the information stored in the first storage unit and a detection result of the contact detection unit;

a second storage unit that stores information in which an operation target of the operation dial is set for each mode; and an operation target setting unit that sets the operation target of the operation dial based on the information stored in the second storage unit and the mode set by the mode setting unit.

According to the embodiment, in the case where the finger touches the top surface of the operation dial and is moved, the mode of the camera is switched according to a moved direction. Accordingly, it is possible to quickly switch the mode. Further, according to the embodiment, the operation target of the operation dial is switched in conjunction with the switching of the mode. The operation target is a main setting item in each mode. For example, in a case where the switching of the exposure mode is possible, the operation target is program shift in a case of a program mode, the operation target is a shutter speed in a case of a shutter speed priority mode, the operation target is an F-number in a case of an aperture priority mode, and the operation target is the shutter speed or the F-number in a case of a manual mode. Accordingly, it is possible to provide good operability.

(4) A camera comprising:

a rotary operation dial;

a contact detection unit that individually detects contact with a plurality of contact detection regions to be set on a top surface of the operation dial;

a first storage unit that stores information on a mode to be set in a case where each contact detection region is touched alone;

a mode setting unit that sets the mode based on the information stored in the first storage unit and a detection result of the contact detection unit;

a second storage unit that stores information in which an operation target of the operation dial is set for each mode; and an operation target setting unit that sets the operation target of the operation dial based on the information stored in the second storage unit and the mode set by the mode setting unit.

According to the embodiment, in the case where the top surface of the operation dial is touched, the mode of the camera is switched according to a touched region. Accordingly, it is possible to quickly switch the mode. Further, according to the embodiment, the operation target of the operation dial is switched in conjunction with the switching of the mode. The operation target is a main setting item in each mode. For example, in a case where the switching of the exposure mode is possible, the operation target is program shift in a case of a program mode, the operation target is a shutter speed in a case of a shutter speed priority mode, the operation target is an F-number in a case of an aperture priority mode, and the operation target is the shutter speed or the F-number in a case of a manual mode. Accordingly, it is possible to provide good operability.

(5) The camera according to (4), wherein the first storage unit further stores information on a mode to be set by default.

According to the embodiment, the mode to be set by default is prepared. The mode to be set by default refers to a mode to be set normally and a mode to be set before the top surface of the operation dial is touched to switch the mode. For example, in a case where two regions of a first contact detection region and a second contact detection region are set on the top surface of the operation dial as the contact detection region, a mode to be set initially is the mode to be set normally. In this state, a first mode is set in a case where the first contact detection region is touched, and a second mode is set in a case where the second contact detection region is touched. Further, in a state where the first mode is set, the mode returns to the mode to be set by default in the case where the first contact detection region is touched, and the second mode is set in the case where the second contact detection region is touched.

(6) The camera according to (4) or (5), wherein the first storage unit further stores information on a mode to be set in a case where the plurality of contact detection regions are simultaneously touched.

According to the embodiment, in the case where the plurality of contact detection regions are simultaneously touched, a specific mode is set. Accordingly, it is possible to set the mode to equal to or larger than the number of set contact detection regions. It is effective in a case where the size of the operation dial is small.

(7) The camera according to (4), wherein at least a first contact detection region and a second contact detection region are set on the top surface of the operation dial, wherein the contact detection unit individually detects contact with at least the first contact detection region and the second contact detection region, wherein the first storage unit stores that a mode to be set in a case where the first contact detection region is touched alone is a shutter speed priority mode and a mode to be set in a case where the second contact detection region is touched alone is an aperture priority mode, and wherein the second storage unit stores that the operation target of the operation dial in a case where the shutter speed priority mode is set is a shutter speed and the operation target of the operation dial in a case where the aperture priority mode is set is an F-number.

According to the embodiment, at least two contact detection regions (first contact detection region and second contact detection region) are set on the top surface of the operation dial. The shutter speed priority mode is set in a case where the first contact detection region is touched alone, and the aperture priority mode is set in a case where the second contact detection region is touched alone. In the case where the shutter speed priority mode is set, the operation target of the operation dial is set to the shutter speed. Further, in the case where the mode is set to the aperture priority mode, the operation target of the operation dial is set to the F-number. Accordingly, it is possible to quickly switch the exposure mode. Further, it is possible to easily set the setting required for each mode by the operation dial.

(8) The camera according to (7), wherein the first storage unit further stores that the mode to be set by default is a program mode, and wherein the second storage unit further stores that the operation target of the operation dial in the case where the program mode is set is program shift.

According to the embodiment, it is possible to further select the program mode as the exposure mode. The program mode is prepared as the mode to be set by default. In the case where the program mode is set, the operation target of the operation dial is set to the program shift.

(9) The camera according to claim (7) or (8), wherein the first storage unit further stores that a mode to be set in a case where the first contact detection region and the second contact detection region are simultaneously touched is a manual mode, and wherein the second storage unit further stores that the operation target of the operation dial in the case where the manual mode is set is the F-number or the shutter speed.

According to the embodiment, it is possible to further select the manual mode as the exposure mode. In the case where the first contact detection region and the second contact detection region are simultaneously touched, the manual mode is set. In the case where the manual mode is set, the operation target of the operation dial is set to the F-number or the shutter speed.

(10) The camera according to any one of (4) to (9), wherein the information on the operation target of the operation dial to be set in the case where each contact detection region is touched alone is displayed for each contact detection region on the top surface of the operation dial.

According to the embodiment, the information on the operation target of the operation dial to be set in the case where each contact detection region is touched alone is displayed on the top surface of the operation dial. Each piece of information is displayed for each contact detection region. Accordingly, it is possible to grasp at a glance the operation target of the operation dial to be set in the case where each contact detection region is touched. Further, accordingly, it is possible to provide an intuitive operation.

(11) The camera according to any one of (4) to (9), further comprising:

a dial display section provided on the top surface of the operation dial; and a dial display control unit that controls a display on the dial display section, wherein the dial display control unit displays the information on the operation target of the operation dial to be set in the case where each contact detection region is touched alone for each contact detection region.

According to the embodiment, the dial display section is provided on the top surface of the operation dial. The display on the dial display section is controlled by the dial display control unit. The dial display control unit displays the information on the operation target of the operation dial to be set in the case where each contact detection region is touched alone for each contact detection region. Accordingly, it is possible to grasp at a glance the operation target of the operation dial. Further, accordingly, it is possible to provide the intuitive operation.

(12) The camera according to (11), wherein the dial display control unit changes a display form of the dial display section according to a set mode.

According to the embodiment, the display form of the dial display section is changed according to the set mode. Accordingly, it is possible to grasp at a glance the set mode from the display on the dial display section.

(13) The camera according to any one of (4) to (12), further comprising:

a setting display section; and a setting display control unit that controls a display on the setting display section, wherein the setting display control unit displays at least information on a mode to be set by the mode setting unit on the setting display section.

According to the embodiment, the information on the mode to be set by the mode setting unit is displayed on the setting display section. Accordingly, it is possible to easily grasp a currently set mode.

(14) A setting method of a camera comprising:

step of detecting contact of a finger with a top surface of a rotary operation dial and a contact position of the finger on the top surface of the operation dial;

step of setting a mode based on information on a mode to be set in a case where the contact of the finger with the top surface of the operation dial is detected and a mode set for each of a plurality of regions set on the top surface of the operation dial and a detection result of the contact of the finger with the top surface of the operation dial; and step of setting an operation target of the operation dial based on information in which the operation target of the operation dial is set for each mode and the set mode.

According to the embodiment, in the case where the top surface of the operation dial is touched by the finger, the mode of the camera is switched according to the touched position. Accordingly, it is possible to quickly switch the mode. Further, according to the embodiment, the operation target of the operation dial is switched in conjunction with the switching of the mode. The operation target is a main setting item in each mode. For example, in a case where the switching of the exposure mode is possible, the operation target is program shift in a case of a program mode, the operation target is a shutter speed in a case of a shutter speed priority mode, the operation target is an F-number in a case of an aperture priority mode, and the operation target is the shutter speed or the F-number in a case of a manual mode. Accordingly, it is possible to provide good operability.

(15) A setting method of a camera comprising:

step of detecting a movement and a movement direction of a finger touching a top surface of a rotary operation dial;

step of setting a mode based on information on a mode to be set in a case where the movement of the finger touching the top surface of the operation dial is detected and a mode set for each movement direction and a detection result of the movement of the finger on the top surface of the operation dial; and step of setting an operation target of the operation dial based on information in which the operation target of the operation dial is set for each mode and the set mode.

According to the embodiment, in the case where the finger touches the top surface of the operation dial and is moved, the mode of the camera is switched according to a moved direction. Accordingly, it is possible to quickly switch the mode. Further, according to the embodiment, the operation target of the operation dial is switched in conjunction with the switching of the mode. The operation target is a main setting item in each mode. For example, in a case where the switching of the exposure mode is possible, the operation target is program shift in a case of a program mode, the operation target is a shutter speed in a case of a shutter speed priority mode, the operation target is an F-number in a case of an aperture priority mode, and the operation target is the shutter speed or the F-number in a case of a manual mode. Accordingly, it is possible to provide good operability.

(16) A setting method of a camera comprising:

step of individually detecting contact with a plurality of contact detection regions to be set on a top surface of a rotary operation dial;

step of setting a mode based on information on a mode to be set in a case where each contact detection region is touched alone and a detection result of the contact with the contact detection region; and step of setting an operation target of the operation dial based on information in which the operation target of the operation dial is set for each mode and the set mode.

According to the embodiment, in the case where the top surface of the operation dial is touched, the mode of the camera is switched according to a touched region. Accordingly, it is possible to quickly switch the mode. Further, according to the embodiment, the operation target of the operation dial is switched in conjunction with the switching of the mode. The operation target is a main setting item in each mode. For example, in a case where the switching of the exposure mode is possible, the operation target is program shift in a case of a program mode, the operation target is a shutter speed in a case of a shutter speed priority mode, the operation target is an F-number in a case of an aperture priority mode, and the operation target is the shutter speed or the F-number in a case of a manual mode. Accordingly, it is possible to provide good operability.

(17) A setting program of a camera causing a computer to realize:

a function of setting a mode based on a detection result of a contact detection unit that detects contact of a finger with a top surface of a rotary operation dial and a contact position of the finger on the top surface of the operation dial and information on a mode to be set in a case where the contact of the finger with the top surface of the operation dial is detected and a mode set for each of a plurality of regions set on the top surface of the operation dial; and a function of setting an operation target of the operation dial based on information in which the operation target of the operation dial is set for each mode and the set mode.

According to the embodiment, in the case where the top surface of the operation dial is touched by the finger, the mode of the camera is switched according to the touched position. Accordingly, it is possible to quickly switch the mode. Further, according to the embodiment, the operation target of the operation dial is switched in conjunction with the switching of the mode. The operation target is a main setting item in each mode. For example, in a case where the switching of the exposure mode is possible, the operation target is program shift in a case of a program mode, the operation target is a shutter speed in a case of a shutter speed priority mode, the operation target is an F-number in a case of an aperture priority mode, and the operation target is the shutter speed or the F-number in a case of a manual mode. Accordingly, it is possible to provide good operability.

(18) A setting program of a camera causing a computer to realize:

a function of setting a mode based on a detection result of a contact detection unit that detects a movement and a movement direction of a finger touching a top surface of a rotary operation dial and information on a mode to be set in a case where the movement of the finger touching the top surface of the operation dial is detected and a mode set for each movement direction; and a function of setting an operation target of the operation dial based on information in which the operation target of the operation dial is set for each mode and the set mode.

According to the embodiment, in the case where the finger touches the top surface of the operation dial and is moved, the mode of the camera is switched according to a moved direction. Accordingly, it is possible to quickly switch the mode. Further, according to the embodiment, the operation target of the operation dial is switched in conjunction with the switching of the mode. The operation target is a main setting item in each mode. For example, in a case where the switching of the exposure mode is possible, the operation target is program shift in a case of a program mode, the operation target is a shutter speed in a case of a shutter speed priority mode, the operation target is an F-number in a case of an aperture priority mode, and the operation target is the shutter speed or the F-number in a case of a manual mode. Accordingly, it is possible to provide good operability.

(19) A setting program of a camera causing a computer to realize:

a function of setting a mode based on a detection result of a contact detection unit that individually detects contact with a plurality of contact detection regions to be set on a top surface of a rotary operation dial and information on a mode to be set in a case where each of the contact detection regions is touched alone; and a function of setting an operation target of the operation dial based on information in which the operation target of the operation dial is set for each mode and the set mode.

According to the embodiment, in the case where the top surface of the operation dial is touched, the mode of the camera is switched according to a touched region. Accordingly, it is possible to quickly switch the mode. Further, according to the embodiment, the operation target of the operation dial is switched in conjunction with the switching of the mode. The operation target is a main setting item in each mode. For example, in a case where the switching of the exposure mode is possible, the operation target is program shift in a case of a program mode, the operation target is a shutter speed in a case of a shutter speed priority mode, the operation target is an F-number in a case of an aperture priority mode, and the operation target is the shutter speed or the F-number in a case of a manual mode. Accordingly, it is possible to provide good operability.

According to the invention, it is possible to provide the camera having the compact configuration and high operability.

Figure 14:
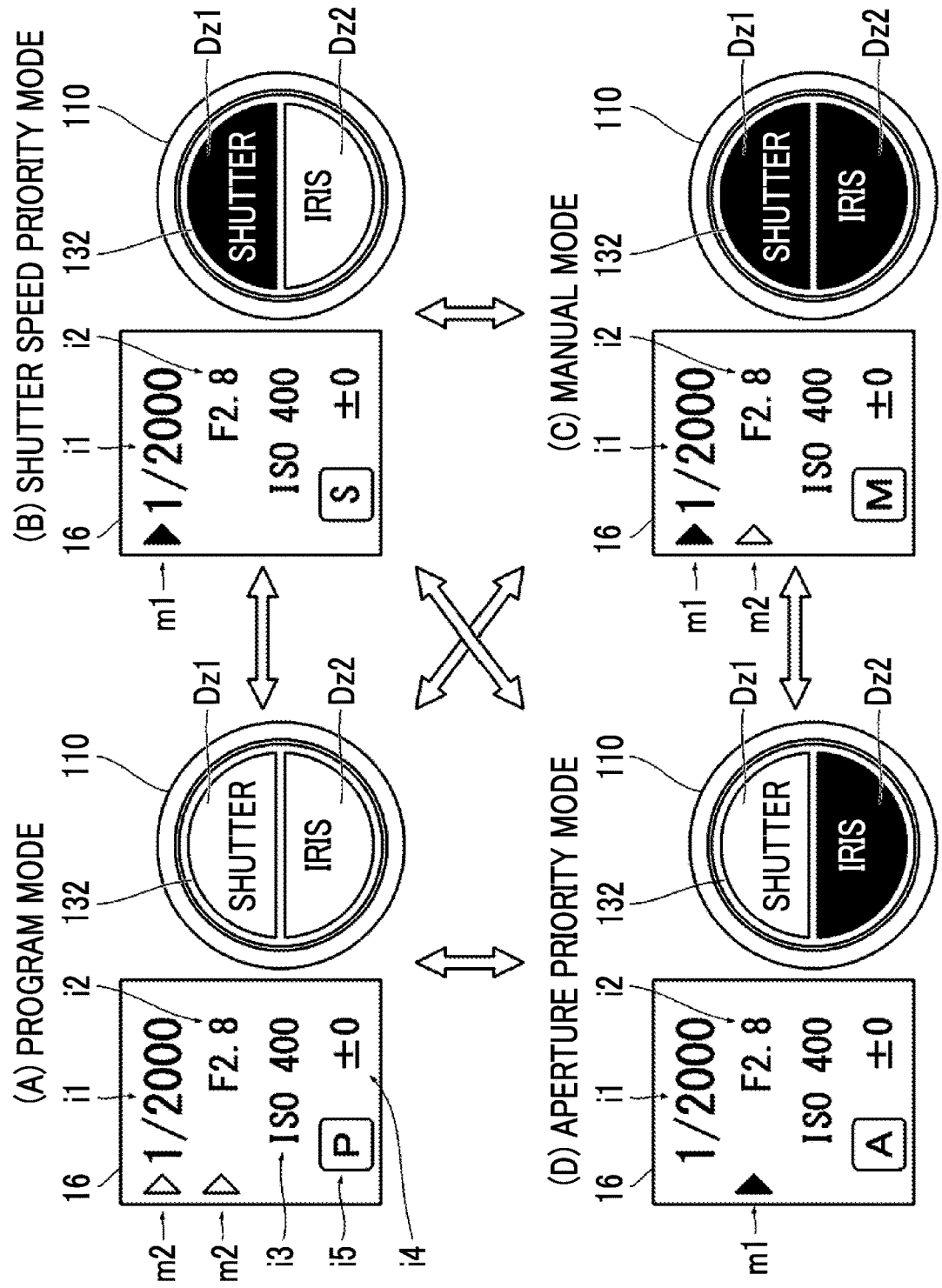

(A), (B), (C), and (D) of FIG. 14 are views of examples of the display on the sub-display that makes an item to be changed in the setting by the operation dial distinguishable from other items.

Figure 15:
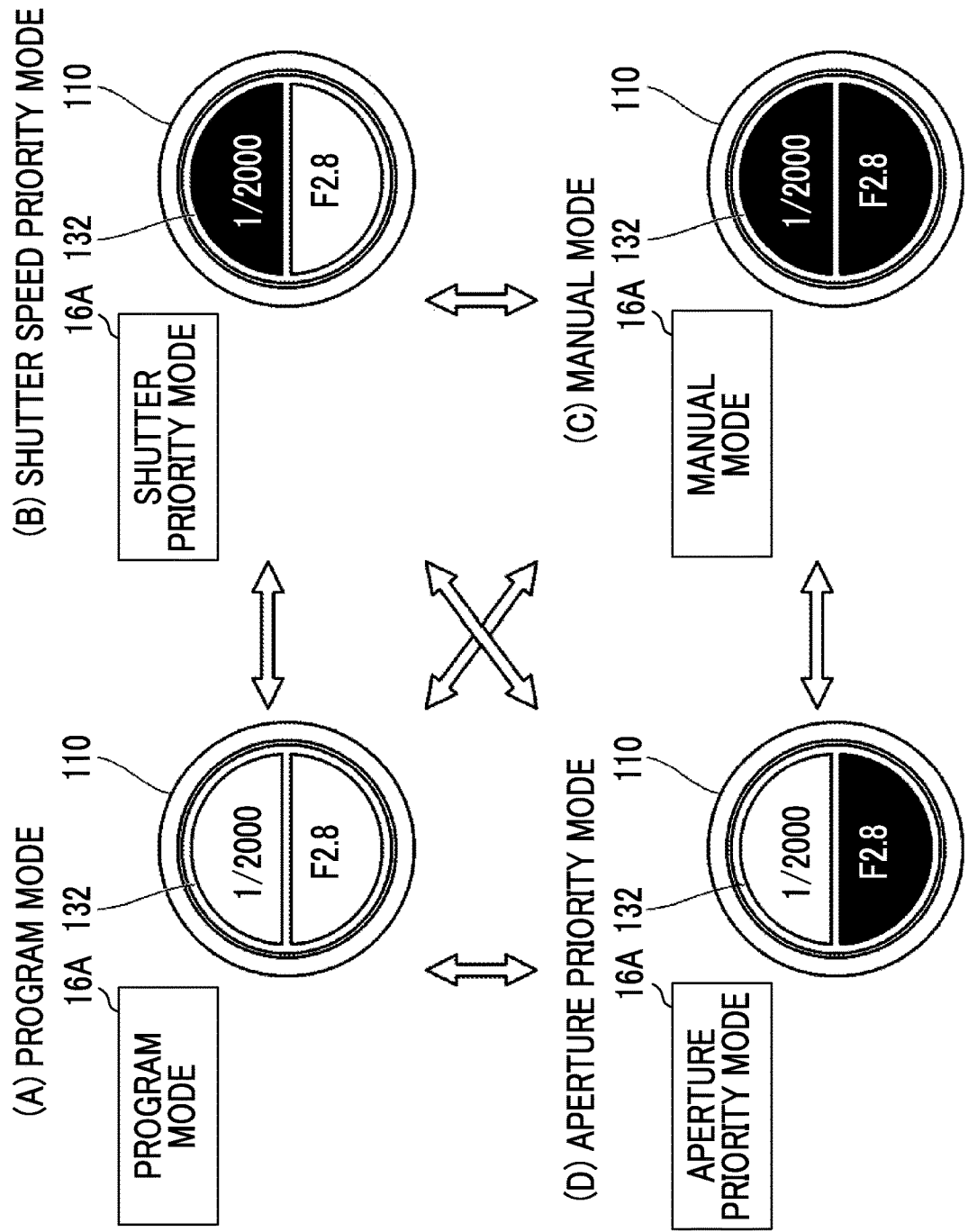

(A), (B), (C), and (D) of FIG. 15 are views of a modification example of the display on the dial-display.

Figure 16:
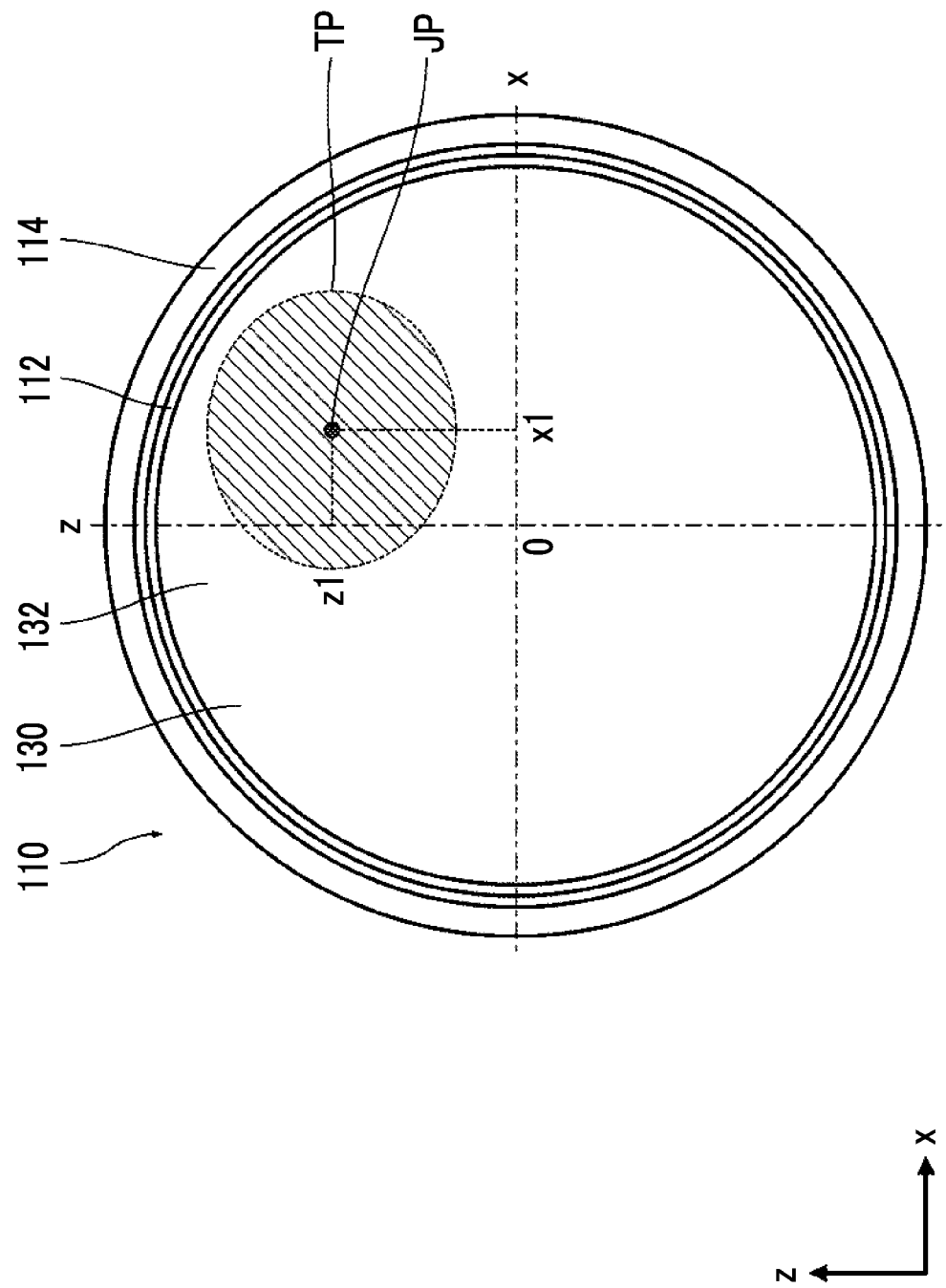

FIG. 16 is a conceptual view of detection of a contact position.

Figure 17:
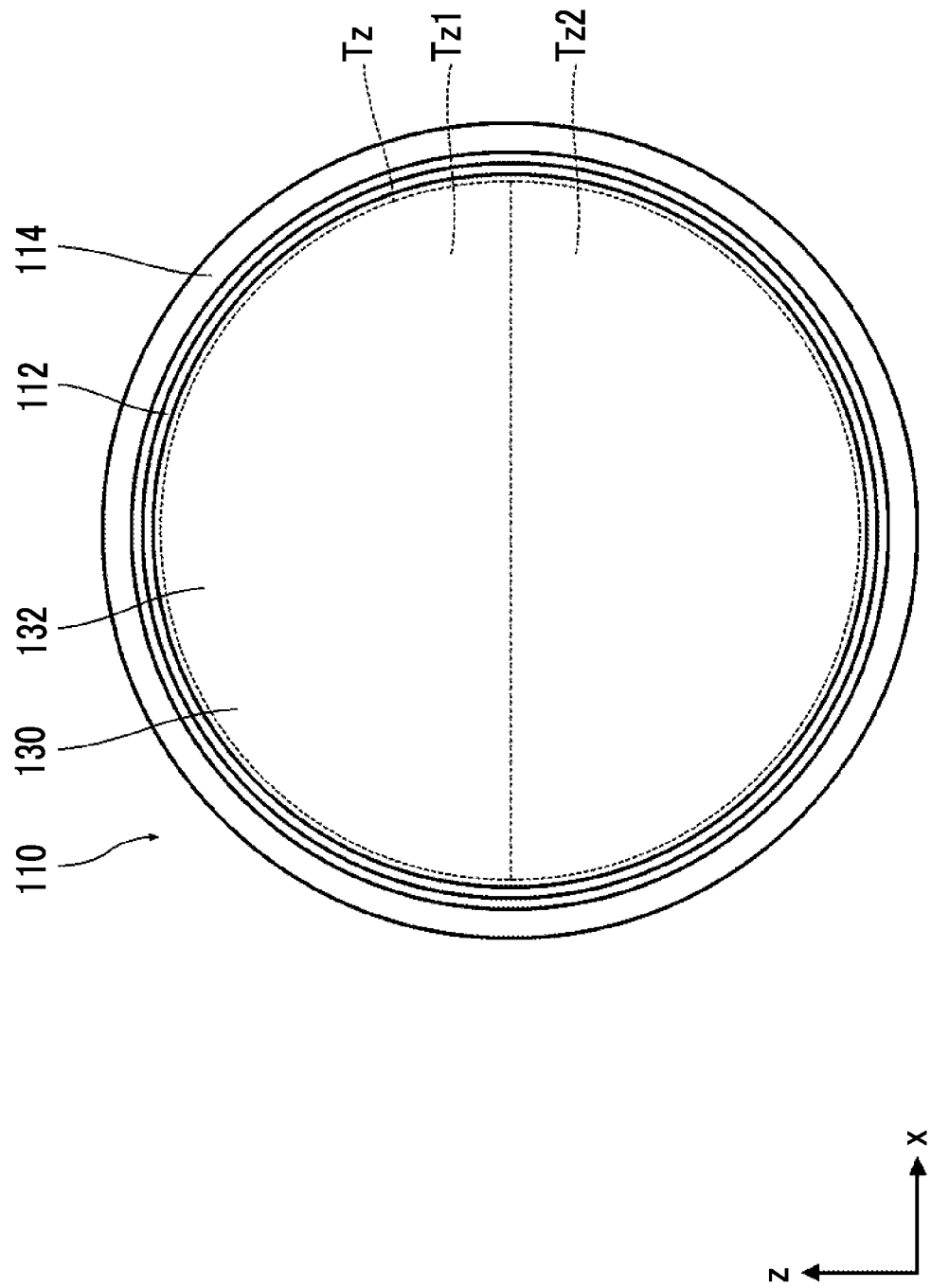

FIG. 17 is a view of an example of a region to be set on a top surface of the operation dial.

Figure 18:
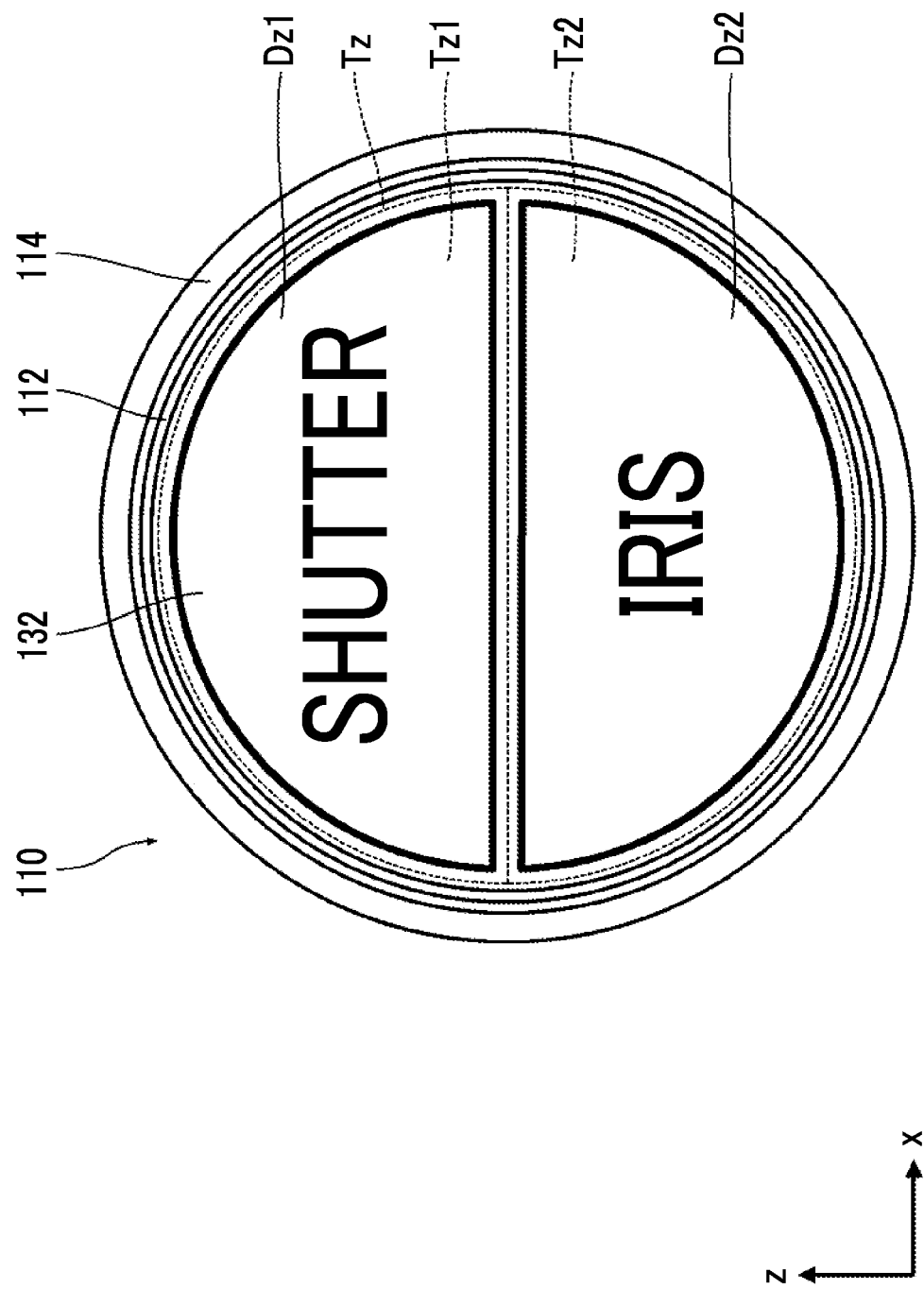

FIG. 18 is a view of an example of the display on the dial-display.

Figure 19:
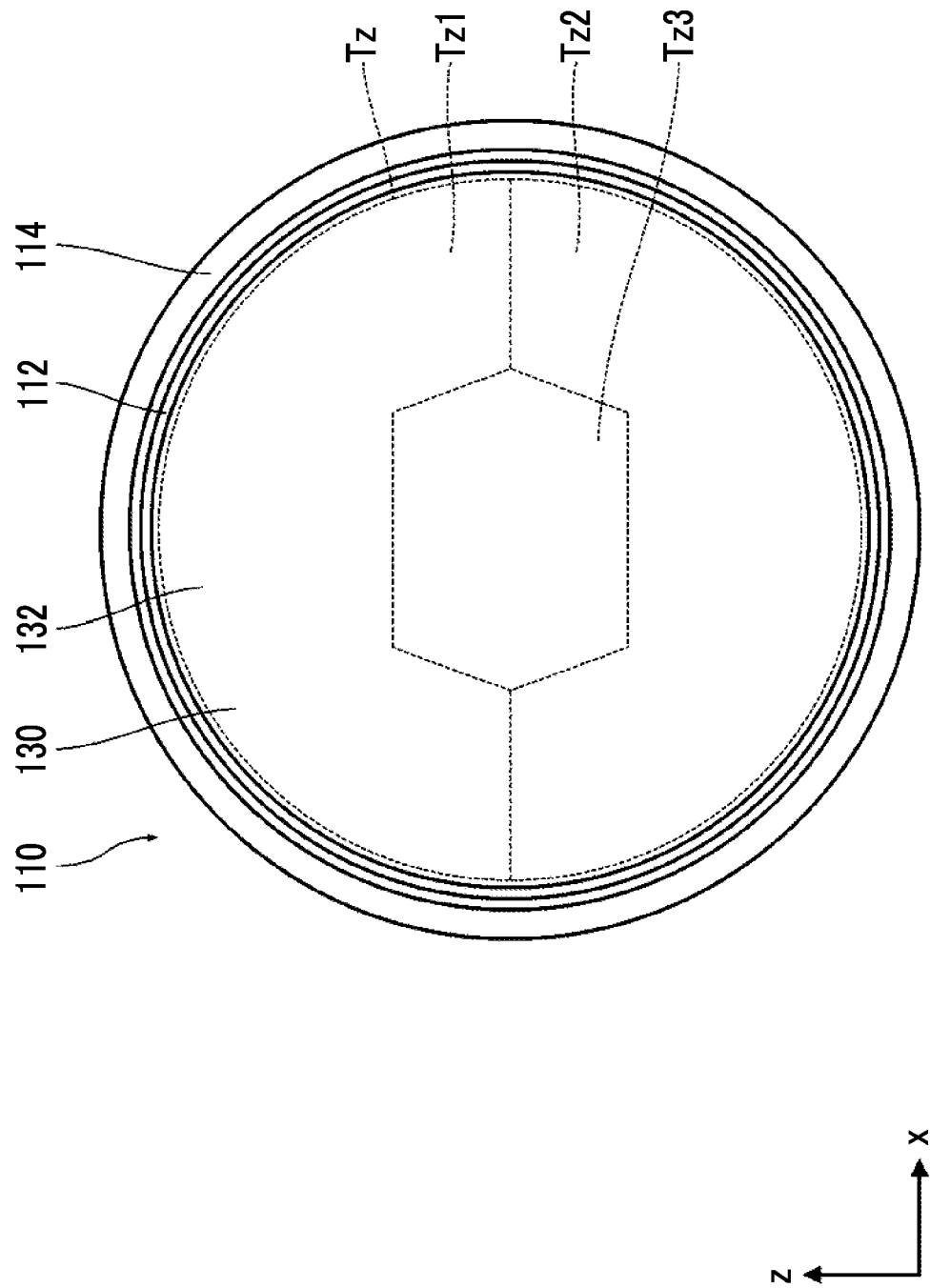

FIG. 19 is a view of another example of the region to be set on a top surface of the operation dial.

DESCRIPTION OF THE PREFERRED EMBODIMENTS

A preferred embodiment of the invention will be described in detail below with reference to accompanying drawings.

First Embodiment

[Appearance of the camera]

Figure 1:
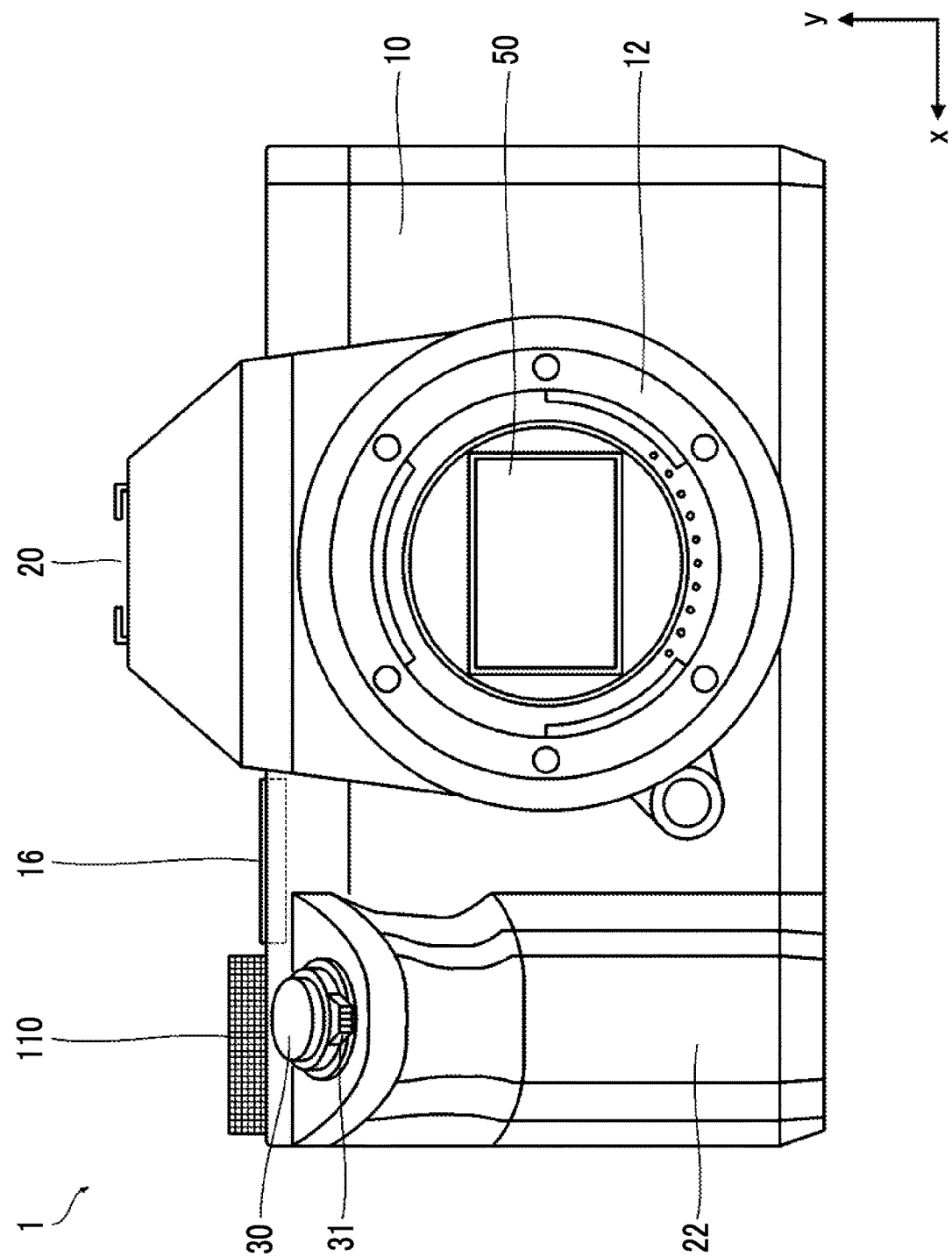
FIG. 1 is a front view of an example of a digital camera.
Figure 2:
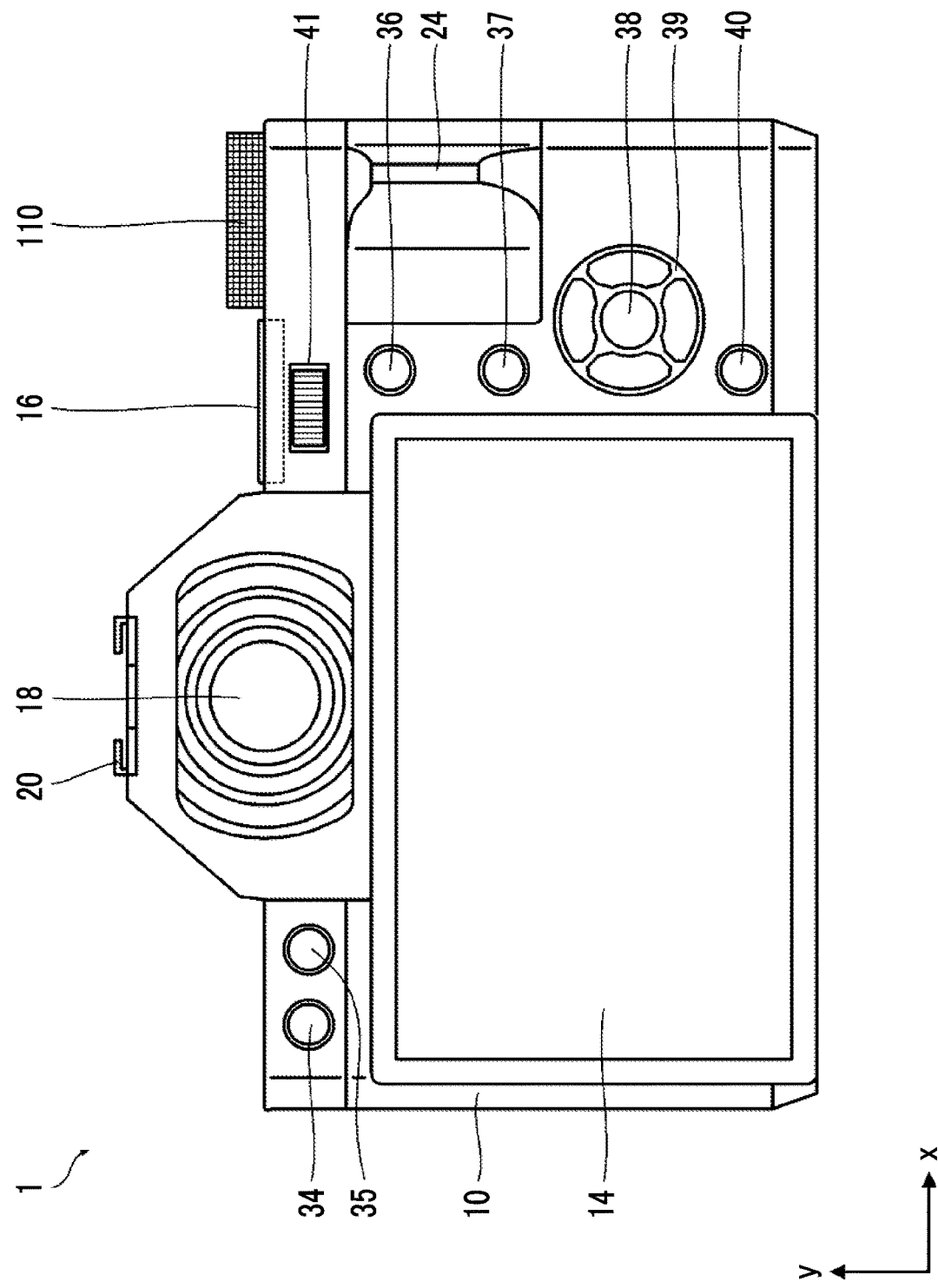
FIG. 2 is a back view of an example of the digital camera.
Figure 3:
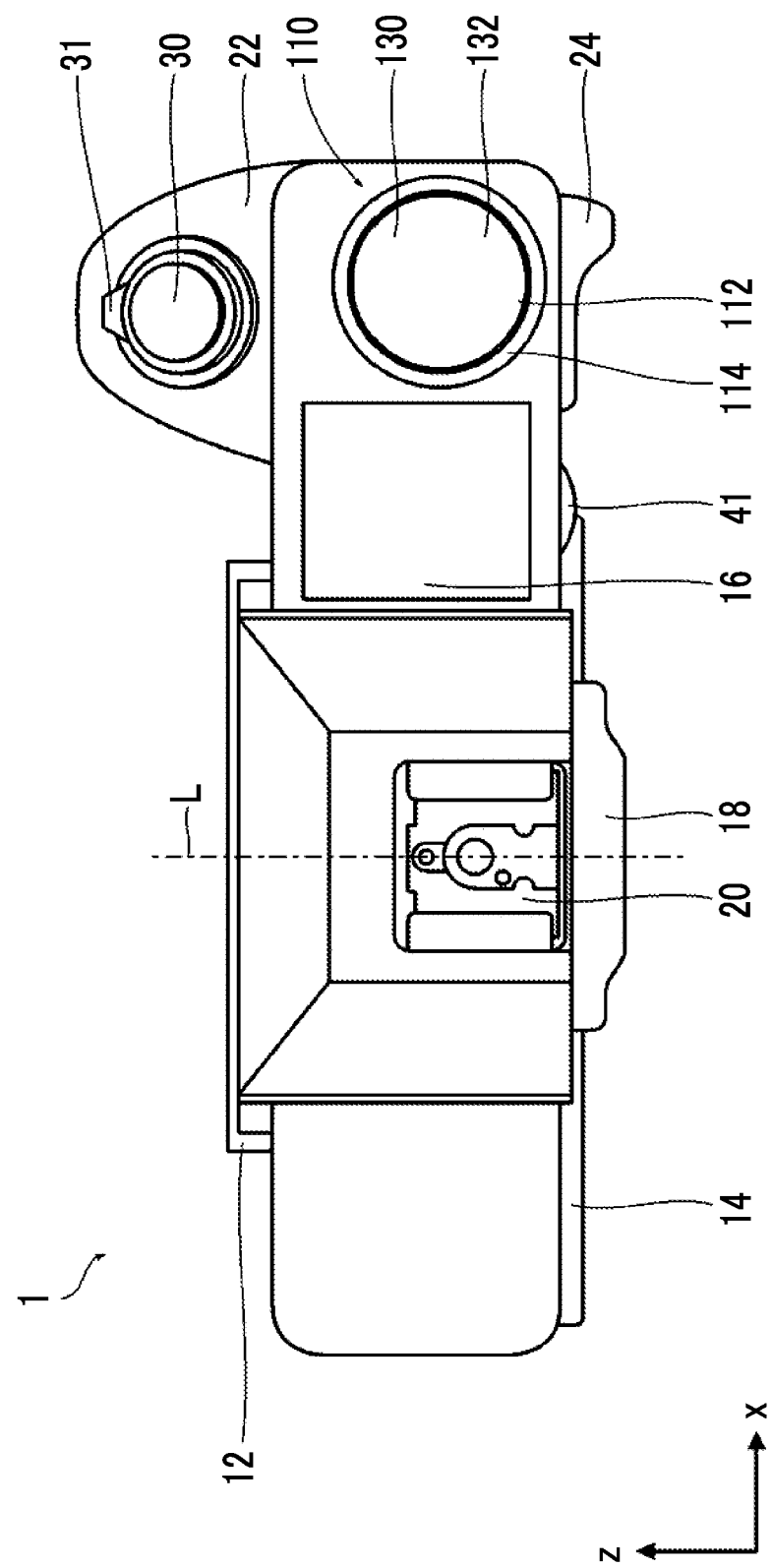
FIG. 3 is a plan view of an example of the digital camera.

FIGS. 1, 2, and 3 are a front view, a back view, and a plan view, respectively, showing an example of a digital camera to which the invention is applied.

In this specification, a direction along an optical axis L (z direction in FIG. 3) is referred to as a front-rear direction and a subject side is referred to as a front direction. Further, on a plane orthogonal to the optical axis L, a direction along a long side of an image sensor 50 (x direction in FIG. 1) is referred to as a lateral direction or a left-right direction and a direction along a short side of the image sensor 50 (y direction in FIG. 1) is referred to as a vertical direction or an up-down direction.

A digital camera 1 of this embodiment is a lens-interchangeable digital camera, and is a non-reflex digital camera. The lens-interchangeable digital camera is a digital camera of which a lens can be interchanged. The non-reflex digital camera is a digital camera not including a reflex mirror for guiding incident light from a lens to an optical viewfinder, and is also referred to as a mirrorless digital camera.

Figure 4:
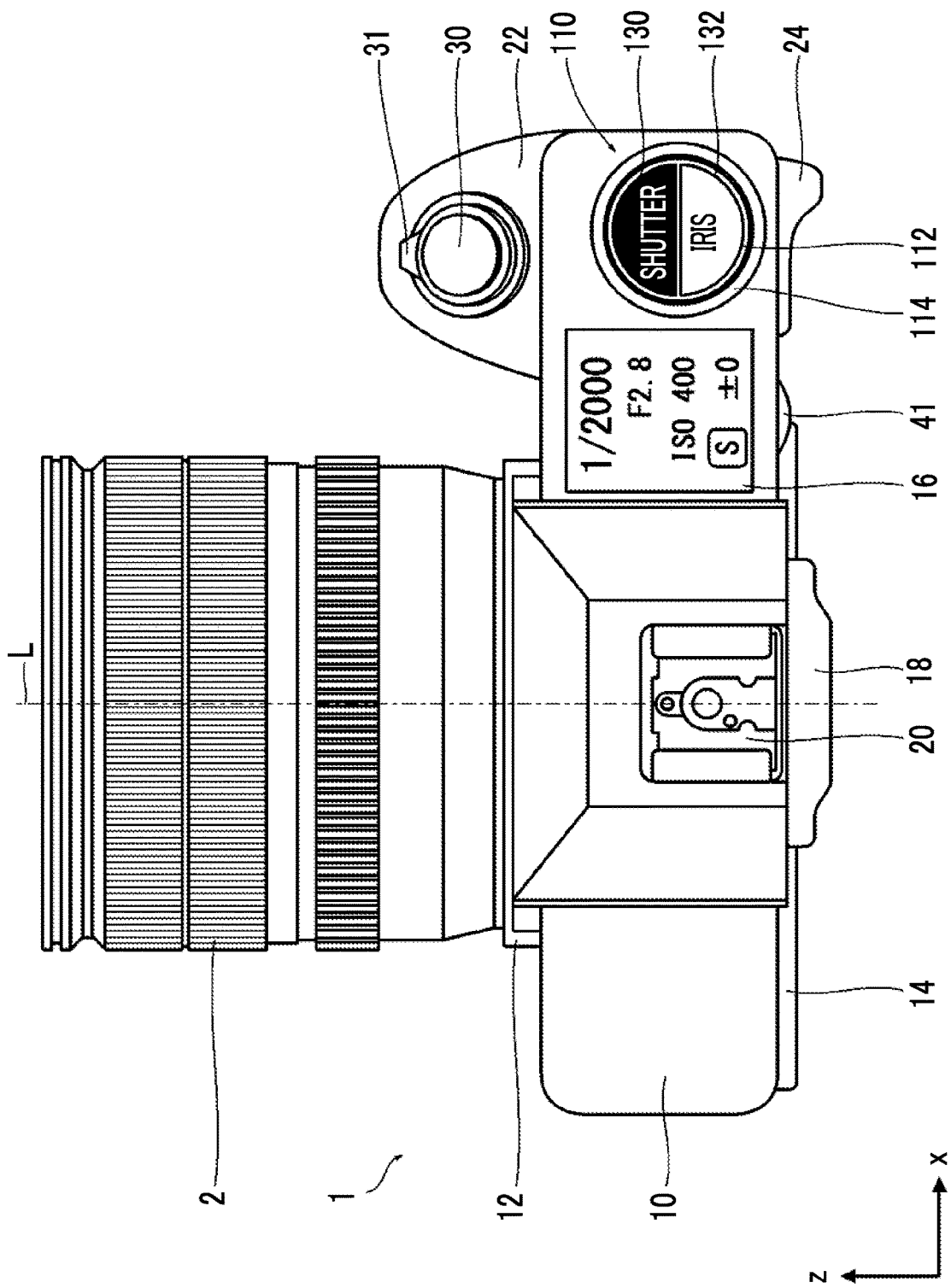
FIG. 4 is a plan view of the digital camera on which a lens is mounted.

FIG. 4 is a plan view of the digital camera on which a lens is mounted. As shown in FIG. 4, the digital camera 1 of this embodiment is used in a state in which a lens 2 is mounted on a camera body 10.

As shown in FIGS. 1 to 4, the camera body 10 is provided with a lens mount 12, a main-display 14, a sub-display 16, an electronic view finder 18, a hot shoe 20, and the like. Further, a shutter button 30, a power supply lever 31, a playback button 34, a delete button 35, an AF lock button 36, an AE lock button 37, a menu button 38, selector buttons 39, a BACK button 40, a rear command dial 41, an operation dial 110, and the like are provided as operation members.

«Camera Body»

The camera body 10 has the shape of a rectangular box that is thin in the front-rear direction. One (left side in FIG. 1) end portion of the camera body 10 is formed as a grip portion. A user grips the grip portion to perform a release operation. The grip portion is provided with a grip 22 on the front surface side and a thumb rest 24 on the back surface side.

«Lens Mount»

The lens mount 12 is a mounting portion for the lens 2. As shown in FIG. 1, the lens mount 12 is provided on the front surface of the camera body 10. The lens 2 is mounted on the lens mount 12 attachably and detachably. The lens mount 12 is formed of a bayonet type.

«Main-display»

The main-display 14 is a display mainly used for the display of an image. As shown in FIG. 2, the main-display 14 is provided on the back surface of the camera body 10. The main-display 14 is formed of, for example, a color liquid crystal display (LCD).

As described above, the main-display 14 is mainly used for the display of the image. The image to be displayed includes a live view image in addition to an imaged image. The live view is a function of displaying an image captured by an image sensor in real time. It is possible to confirm the angle of view, a focus state, and the like on the main-display by performing the live view.

Further, the main-display 14 is also used as a graphical user interface (GUI). That is, in a case where various settings are performed, a setting screen is displayed on the main-display 14 and the various settings are performed on the setting screen.

«Sub-display»

The sub-display 16 is formed of a display device having a small screen as compared with the main-display 14. As shown in FIG. 3, the sub-display 16 is provided on a top surface of the camera body 10. The sub-display 16 is formed of, for example, a reflective LCD comprising illumination. The sub-display 16 has a rectangular display surface, and the short side thereof is disposed in parallel to the optical axis L. More specifically, the short side thereof is disposed along the front-rear direction (z direction), and the long side thereof is disposed along the lateral direction (x direction). The sub-display 16 displays mainly setting contents of the digital camera 1. Detailed display contents will be described below.

«Electronic View Finder»

The electronic view finder (EVF) 18 is an electronic finder in which the LCD is built. As shown in FIG. 2, the electronic view finder 18 is provided on the upper part of the camera body 10 (so-called warship part), and an eyepiece part is provided on the back surface.

«Hot Shoe»

The hot shoe 20 is a mounting portion of an external flash. As shown in FIG. 3, the hot shoe 20 is provided on the top surface of the camera body 10.

«Operation Member»

The camera body 10 is provided with the shutter button 30, the power supply lever 31, the playback button 34, the delete button 35, the AF lock button 36, the AE lock button 37, the menu button 38, the selector buttons 39, the BACK button 40, the rear command dial 41, the operation dial 110, and the like as the operation members.

<Shutter Button>

The shutter button 30 is provided on the top surface (upper surface) of the camera body 10 and disposed on a grip portion side. The shutter button 30 is formed of a so-called two-stage switch that has a half-pressed stage and a fully-pressed stage. In a case where the shutter button 30 is half pressed, imaging preparations, that is, AE and AF are executed. In a case where the shutter button 30 is fully pressed, main imaging, that is, imaging for recording is implemented. The AE is an abbreviation of automatic exposure and refers to a function that the camera automatically measures the brightness of a subject and decides proper exposure. Further, the AF is an abbreviation of automatic focus and refers to a function that the camera automatically measures a distance to the subject and focuses on the subject.

<Power Supply Lever>

The power supply lever 31 is disposed coaxially with the shutter button 30. The power supply lever 31 is formed of a rotary lever. In a case where the power supply lever 31 is rotated to an ON position, a power supply of the digital camera 1 is turned ON. In a case where the power supply lever 31 is rotated to an OFF position, the power supply of the digital camera 1 is turned OFF.

<Playback Button>

The playback button 34 is a button that switches a mode of the digital camera 1 to a playback mode. The playback button 34 is provided on the back surface of the camera body 10 and disposed above the main-display 14. In a case where the playback button 34 is pressed in a state where the mode of the digital camera 1 is set to the imaging mode, the mode of the digital camera 1 is switched to the playback mode. In the case where the playback mode is set, the playback of the imaged image is possible.

A function of switching from the playback mode to the imaging mode is assigned to the shutter button 30. In a case where the shutter button 30 is pressed in a state where the playback mode is set, the mode of the digital camera 1 is switched to the imaging mode. In the case where the imaging mode is set, the imaging is possible.

<Delete Button>

The delete button 35 is a button that performs an instruction to delete the imaged image displayed on the main-display 14. The delete button 35 is provided on the back surface of the camera body 10 and disposed above the main-display 14. In a case where the delete button 35 is pressed in a state where the imaged image is displayed on the main-display 14, a screen that confirms the deletion is displayed on the main-display 14. In a case where the execution of the deletion is instructed according to the display on the main-display 14, the imaged image during playback is deleted from a memory card.

<AF Lock Button>

The AF lock button 36 is a button that performs an instruction to lock the focus. As shown in FIG. 2, the AF lock button 36 is provided on the back surface of the camera body 10 and disposed near a thumb rest 24. In a case where the AF lock button 36 is pressed, the focus is locked.

<AE Lock Button>

The AE lock button 37 is a button that performs an instruction to lock the exposure. As shown in FIG. 2, the AE lock button 37 is provided on the back surface of the camera body 10 and disposed near the thumb rest 24. In a case where the AE lock button 37 is pressed, the exposure is locked.

<Menu Button>

The menu button 38 is a button that calls a menu screen on the main-display 14. The menu button 38 is provided on the back surface of the camera body 10. In a case where the menu button 38 is pressed in a state where the imaging mode or the playback mode is set, the menu screen is displayed on the main-display 14.

The menu button 38 functions also as an OK button and is used in a case of instructing OK for a selection item, a confirmation item, or the like.

<Selector Button>

The selector button 39 is formed of four buttons of up, down, left, and right disposed on the same circle with the menu button 38 as the center. Various functions according to setting situations of the digital camera 1 are assigned to each button. For example, in the case where the digital camera 1 is set to the playback mode, in FIG. 2, a function of one-frame advance is assigned to the button in the right direction, and a function of one-frame return is assigned to the button in the left direction. A function of zoom-in is assigned to the button in the upper direction, and a function of zoom-out is assigned to the button in the lower direction. In the case where the digital camera 1 is set to the imaging mode, in FIG. 2, a function of calling the setting screen of white balance is assigned to the button in the right direction, and a function of calling the setting screen of the self-timer is assigned to the button in the left direction. A function of calling the setting screen of an AF mode is assigned to the button in the upper direction, and a function of calling the setting screen of a consecutive imaging mode is assigned to the button in the lower direction. Furthermore, in a case where the various settings or the like are performed on the main-display 14, the four buttons function as buttons that move a cursor in each direction on the screens.

<BACK Button>

The BACK button 40 is a button that performs an instruction to return the display on the main-display 14 to one previous state. The BACK button 40 is provided on the back surface of the camera body 10. In a case where the BACK button 40 is pressed in a state where various setting screens are displayed on the main-display 14, the display on the main-display 14 is returned to one previous state. Accordingly, it is possible to cancel the selection item, the confirmation item, or the like.

Further, the BACK button 40 functions as a button that performs an instruction to switch the display form of the main-display 14. In the state where the playback mode or the imaging mode is set, the BACK button 40 is pressed, the display form of the main-display 14 is switched. For example, in a case where the BACK button 40 is pressed in the state where the playback mode is set, an imaging condition, histogram, and the like of an image displayed on the main-display 14 are displayed on the image in an overlapped manner. For example, in a case where the BACK button 40 is pressed in the state where the imaging mode is set, various pieces of information such as the imaging condition or the histogram are displayed on the live view image in an overlapped manner.

<Rear Command Dial>

The rear command dial 41 is rotatably supported in the camera body, and a part of the outer periphery thereof is provided so as to be exposed on the back surface of the camera body 10. In particular, in the digital camera 1 of the embodiment, the rear command dial 41 is disposed at a position operable with the thumb of a hand gripping the camera body 10. Various functions are assigned to the rear command dial 41 according to a setting state of the digital camera 1.

<Operation Dial>

The operation dial 110 is an example of a rotary operation dial. An operation target of the operation dial 110 is automatically switched by the mode. This point will be described below, The operation dial 110 is provided on the top surface of the camera body 10. In particular, in the digital camera 1 of the embodiment, the operation dial 110 is provided at an end portion on the grip portion side on the top surface of the camera body 10. Accordingly, it is possible to operate the operation dial 110 with a finger of the gripping hand while gripping the camera body 10.

Figure 5:
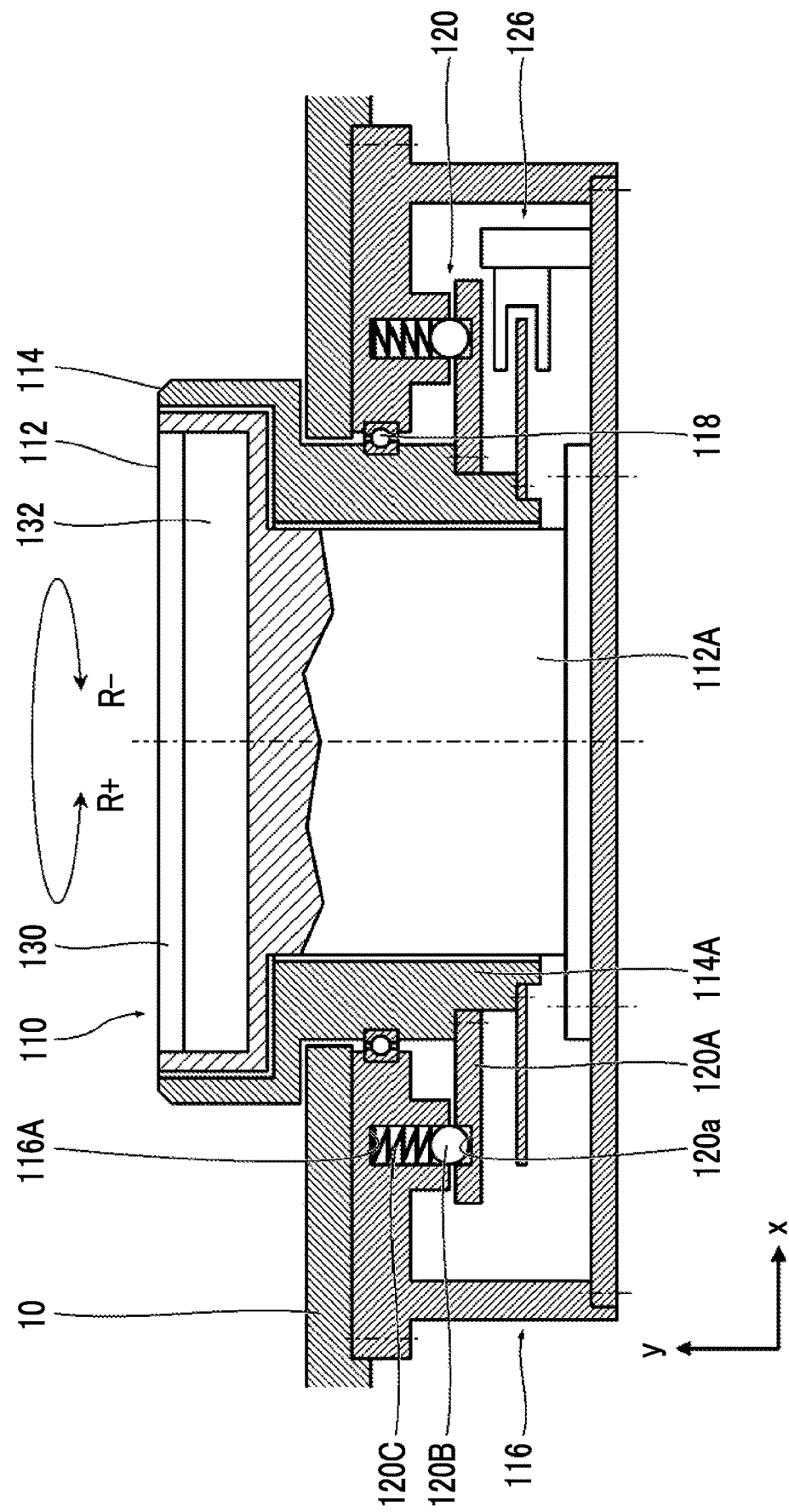
FIG. 5 is a longitudinal cross section view of the schematic configuration of an operation dial.

FIG. 5 is a longitudinal cross section view showing the schematic configuration of the operation dial. Further, FIG. 6 is a plan view of the schematic configuration of the operation dial.

Figure 6:
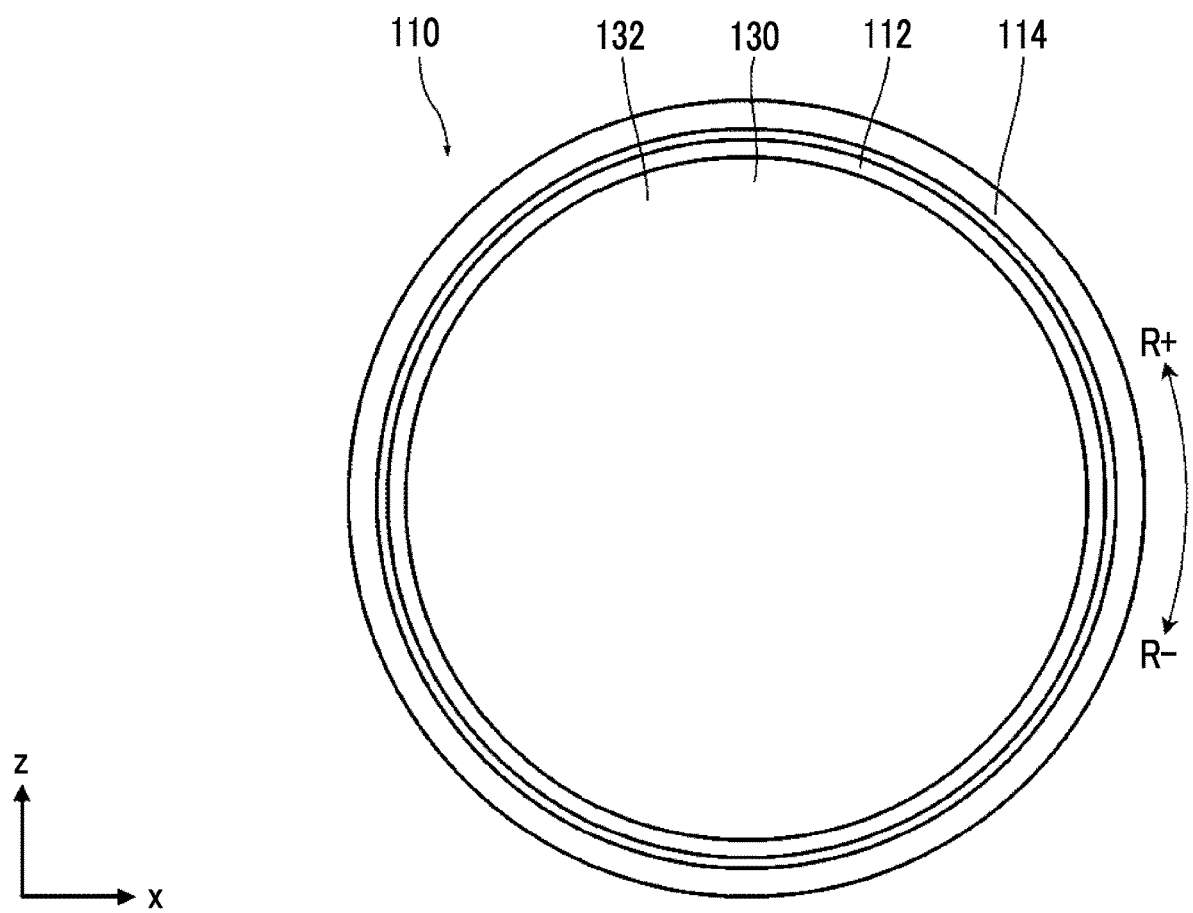
FIG. 6 is a plan view of a schematic configuration of the operation dial.

As shown in FIGS. 5 and 6, the operation dial 110 has a disc-like appearance shape as a whole. The operation dial 110 mainly comprises an inner peripheral part 112 and an outer peripheral part 114. The inner peripheral part 112 is a non-rotating fixed part, and the outer peripheral part 114 is a rotating movable part. The inner peripheral part 112 has the disc-like appearance shape, and the outer peripheral part 114 has a ring-like appearance shape. The outer peripheral part 114 is disposed on the outer periphery of the inner peripheral part 112 and is rotatably provided on the outer periphery of the inner peripheral part 112. The operation dial 110 is operated by rotating the outer peripheral part 114.

The operation dial 110 is assembled to the camera body 10 through an operation dial support frame 116.

The inner peripheral part 112 has a columnar support part 112A on the coaxially lower portion. The support part 112A is fixed to the operation dial support frame 116 to fix the inner peripheral part 112 to the camera body 10.

The inner peripheral part 112 has a flat upper-end surface. The upper-end surface of the inner peripheral part 112 configures the top surface of the operation dial 110. A touch sensor 130 and a dial-display 132 are provided on an upper end portion of the inner peripheral part 112.

The touch sensor 130 is an example of a contact detection unit. The touch sensor 130 individually detects contact with a plurality of contact detection regions set on the upper-end surface of the inner peripheral part 112. An exposure mode is switched based on a detection result of the touch sensor 130. This point will be described below.

The dial-display 132 is an example of a dial display section. The dial-display 132 is configured of the LCD. The dial-display 132 has a circular display section, and the almost entire region of the inner peripheral part 112 is set as a display region.

The touch sensor 130 is disposed on the dial-display 132 in an overlapped manner. That is, the inner peripheral part 112 has a configuration of comprising a touch panel on the upper-end surface thereof.

The outer peripheral part 114 has a cylindrical shaft portion 114A on the coaxially lower portion, and the shaft portion 114A is rotatably supported by the operation dial support frame 116 through bearings 118.

The outer peripheral part 114 is supported so as to be rotatable in normal and reverse directions. In FIGS. 5 and 6, an arrow direction (counterclockwise rotation direction) indicated by a reference numeral R+ is referred to as a plus rotation direction, and an arrow direction (clockwise rotation direction) indicated by a reference numeral R− is referred to as a minus rotation direction.

A click mechanism 120 is provided in the operation dial support frame 116. The click mechanism 120 generates a click feeling in the rotation of the outer peripheral part 114 of the operation dial 110.

The click mechanism 120 comprises a click groove-metal plate 120A, click balls 120B, and click springs 120C.

The click groove-metal plate 120A has the disc shape that comprises a circular hole at the center thereof. The click groove-metal plate 120A is fixed to the shaft portion 114A of the outer peripheral part 114 by passing the shaft portion 114A of the outer peripheral part 114 through the center hole thereof. The click groove-metal plate 120A is disposed coaxially with the outer peripheral part 114 and rotates together with the outer peripheral part 114.

The click groove-metal plate 120A is provided with a plurality of click grooves 120a that are formed on the same circumference at regular intervals. The click grooves 120a are provided on the upper surface of the click groove-metal plate 120A as spherical depressions. The disposition interval of the click grooves 120a is an interval that generates the click feeling.

The click balls 120B are members that are fitted to the click grooves 120a and generate the click feelings. The click balls 120B are provided in the operation dial support frame 116. The operation dial support frame 116 comprises click ball-receiving holes 116A that receive the click balls 120B. The click ball-receiving holes 116A are provided parallel to the rotation axis of the outer peripheral part 114 as bottom holes. Further, the click ball-receiving holes 116A are provided at positions facing the click grooves 120a.

The click springs 120C are members that bias the click balls 120B to the click groove-metal plate 120A. The click springs 120C are received in the click ball-receiving holes 116A.

The action of the click mechanism 120 having the above-mentioned configuration is as follows.

In a case where the outer peripheral part 114 of the operation dial 110 is rotated, the click groove-metal plate 120A is rotated. In a case where the click groove-metal plate 120A is rotated, the click balls 120B are fitted to the click grooves 120a at regular angular intervals. Accordingly, the click feelings are generated at regular angular intervals.

Further, in a case where the rotation of the click groove-metal plate 120A is stopped at the time of generation of the click feeling, the click balls 120B are fitted to the click grooves 120a. Accordingly, the rotation of the click groove-metal plate 120A is stopped. That is, as long as the click groove-metal plate 120A is not rotated with a load equal to or larger than a certain level, a stop state of the click groove-metal plate 120A is maintained. The state where the click balls 120B are fitted to the click grooves 120a and the rotation of the click groove-metal plate 120A is stopped is referred to as click-stop.

In a case where a click-stop position is referred to as a click position, the number of click positions is the same as the number of click grooves 120a. The intervals of the click positions are also the same as the intervals of the click grooves 120a. For example, in a case where the number of click positions per rotation is 10, the disposition interval of the click grooves 120a becomes 36°. In this case, in a case where the outer peripheral part 114 is rotationally operated, the click feeling is generated at 36° interval. Further, it is possible to perform the click-stop at 36° interval.

The rotation of the outer peripheral part 114 of the operation dial 110 is detected by a rotation detection unit 126. The rotation detection unit 126 detects the rotation direction and a rotation amount of the outer peripheral part 114 of the operation dial 110. The rotation detection unit 126 is formed of a rotary encoder and detects the rotation of the outer peripheral part 114 of the operation dial 110 to detect the rotation direction and the rotation amount of the operation dial 110.

For example, in the case where the number of click positions per rotation is 10, it is possible to detect that the operation dial 110 is rotationally operated by one click in the plus direction R+ by detecting rotation by 36° in the plus direction R+.

[Control System]

Figure 7:
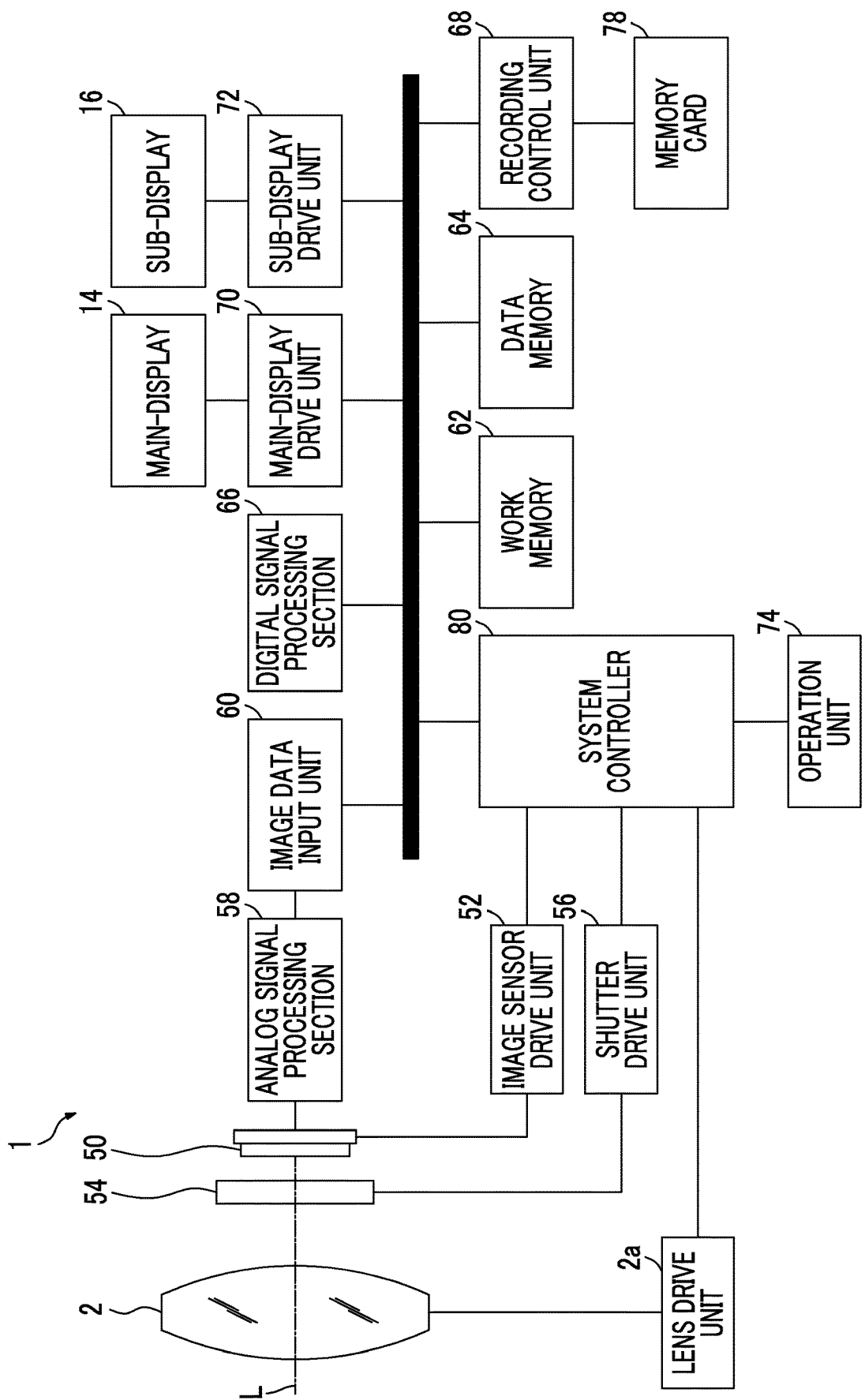
FIG. 7 is a block diagram showing a schematic configuration of a control system of the digital camera.

FIG. 7 is a block diagram showing the schematic configuration of a control system of the digital camera.

The digital camera 1 includes an image sensor 50, an image sensor drive unit 52, a shutter 54, a shutter drive unit 56, an analog signal processing section 58, an image data input unit 60, a work memory 62, a data memory 64, a digital signal processing section 66, a recording control unit 68, a main-display drive unit 70, a sub-display drive unit 72, an operation unit 74, a system controller 80, and the like.

The image sensor 50 converts an optical image of a subject, which is formed through the lens 2, into electrical signals and outputs the electrical signals. A publicly known image sensor, such as a charged coupled device (CCD) image sensor or a complementary metal oxide semiconductor (CMOS) image sensor, is used as the image sensor 50.

The image sensor drive unit 52 drives the image sensor 50 according to a command output from the system controller 80.

The shutter 54 is formed of a square type focal-plane shutter and is disposed directly in front of the image sensor 50. FIG. 1 shows a state where the shutter is fully opened.

The shutter drive unit 56 drives the shutter 54 according to a command output from the system controller 80.

The analog signal processing section 58 receives the signals output from the image sensor 50 and performs required signal processing, such as correlative double sampling processing and amplification processing. Further, the analog signal processing section 58 converts analog image signals subjected to the required signal processing into digital image signals and outputs the digital image signals.

The image data input unit 60 receives the digital image signals to be output from the analog signal processing section 58, according to a command output from the system controller 80. Received image data corresponding to one sheet is stored in the work memory 62.

The work memory 62 is used as a memory for work. The data memory 64 is formed of a non-volatile memory, such as electrically erasable programmable read only memory (EEPROM), and data required for control and the like are stored in the data memory 64.

The digital signal processing section 66 performs required signal processing, such as demosaicing processing, white balance correction, gamma correction, and outline correction, on the image data received in the work memory 62, and generates predetermined image data formed of brightness data (Y data) and color difference data (Cr and Cb data).

The recording control unit 68 accesses a memory card 78, and reads and writes data according to a command output from the system controller 80. Image data obtained by imaging is recorded in the memory card 78.

The main-display drive unit 70 drives the main-display 14 according to a command output from the system controller 80.

The sub-display drive unit 72 drives the sub-display 16 according to a command from the system controller 80.

The operation unit 74 includes the shutter button 30, the power supply lever 31, the playback button 34, the delete button 35, the AF lock button 36, the AE lock button 37, the menu button 38, the selector buttons 39, the BACK button 40, the rear command dial 41, the operation dial 110, and the like, and outputs a signal in response to the operation of each operation member to the system controller 80.

The system controller 80 is a control unit that controls the operation of each unit of the digital camera 1. The function of the system controller 80 is provided by a microcomputer (not shown). That is, the microcomputer executes a predetermined program to function as the system controller 80.

The system controller 80 also functions as a control unit for the lens 2. The system controller 80 controls the operation of the lens 2 through a lens drive unit 2a provided in the lens 2. The lens 2 comprises an aperture, a focus lens, and the like. The lens drive unit 2a comprises an aperture drive unit that drives the aperture, a focus lens drive unit that drives the focus lens, and the like.

[Setting of Exposure Mode]

In the digital camera 1 of the embodiment, the top surface of the operation dial 110 is touched to switch the exposure mode. The operation target of the operation dial 110 is switched in conjunction with the switching of the exposure mode. Hereinafter, functions related to the setting of the exposure mode and the setting of the operation target of the operation dial will be described.

«Configuration»

Figure 8:
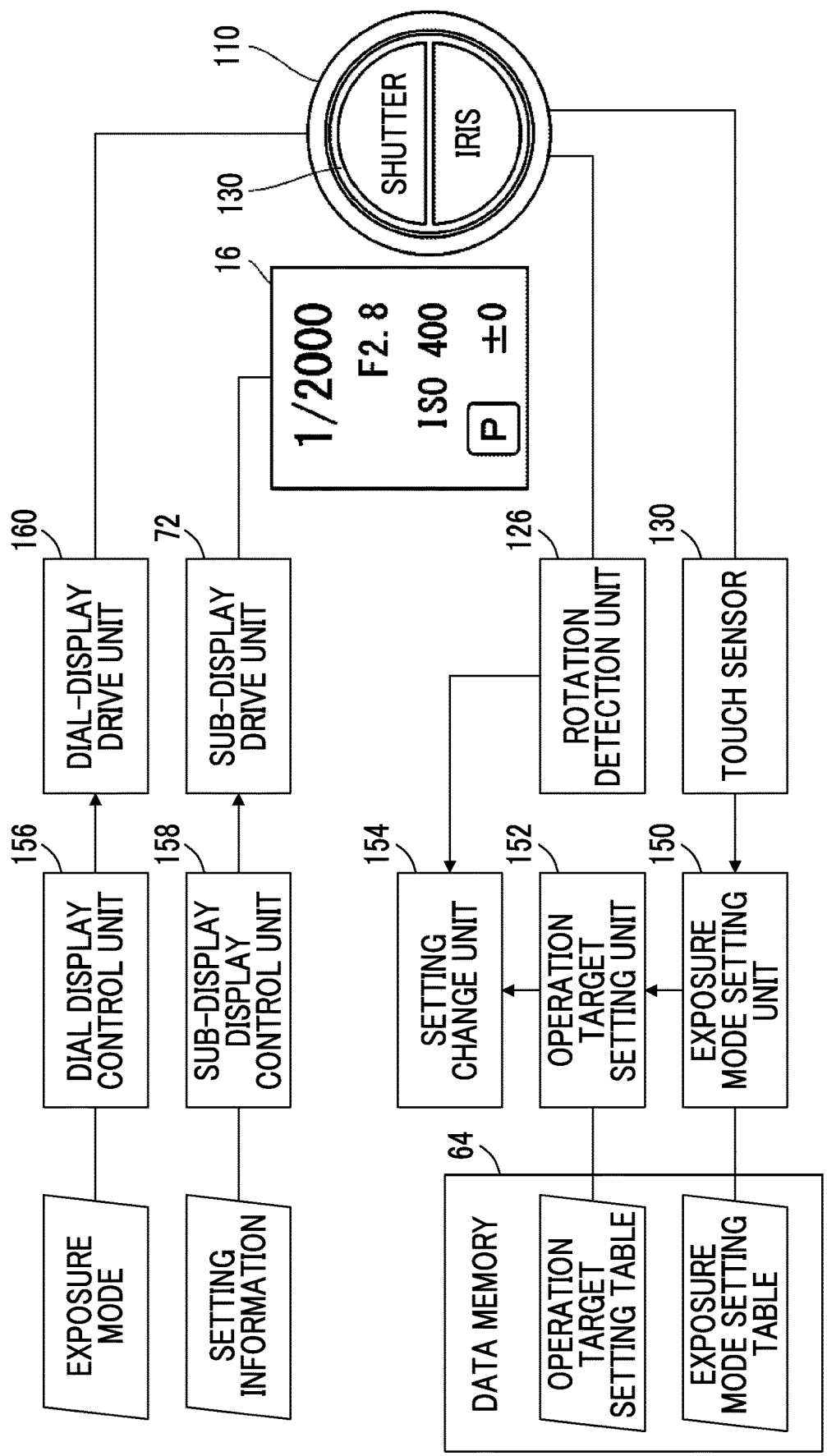
FIG. 8 is a block diagram showing a system configuration of functions related to a setting of an exposure mode and setting of the operation target of an operation dial.

FIG. 8 is a block diagram showing a system configuration of the functions related to the setting of the exposure mode and the setting of the operation target of the operation dial.

As shown in FIG. 8, the system configuring the functions related to the setting of the exposure mode and the setting of the operation target of the operation dial comprises the operation dial 110, the touch sensor 130 that individually detects the contact with the plurality of contact detection regions set on the top surface of the operation dial 110, a data memory 64 in which information on the exposure mode required to be set and information on the operation target required to be set are stored, an exposure mode setting unit 150 that sets the exposure mode based on the detection result of the touch sensor 130, an operation target setting unit 152 that sets the operation target of the operation dial 110 based on the exposure mode set by the exposure mode setting unit 150, a setting change unit 154 that changes the setting of the operation target set by the operation target setting unit 152 based on the operation of the operation dial 110, the dial-display 132, a dial display control unit 156 that controls the display on the dial-display 132, the sub-display 16, and a sub-display display control unit 158 that controls the display on the sub-display 16.

<Operation Dial>

In the operation dial 110, the plurality of contact detection regions are set on the top surface thereof. In the digital camera 1 of the embodiment, two contact detection regions are set on the top surface of the operation dial 110.

Figure 9:
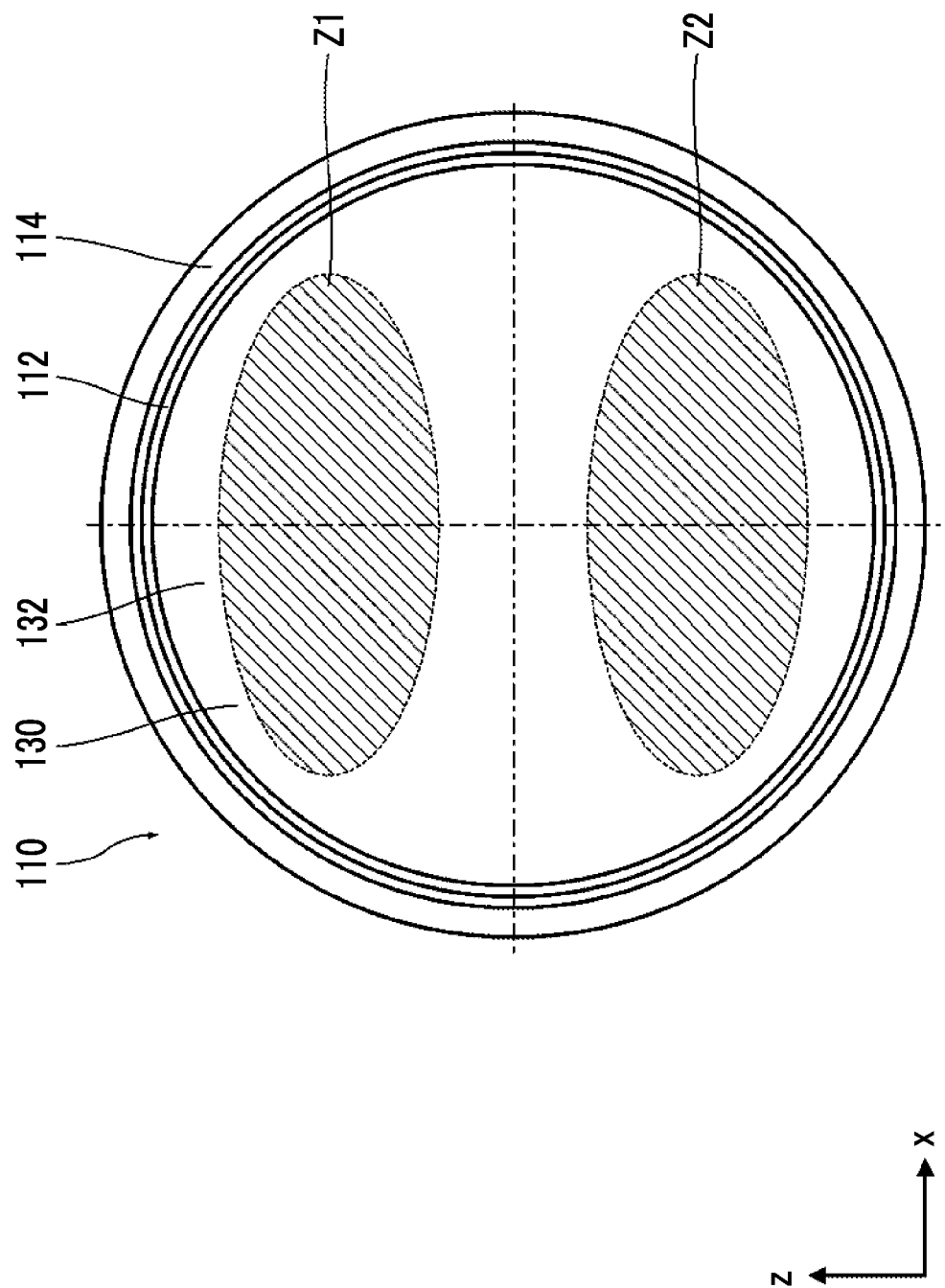
FIG. 9 is a plan view of the operation dial showing an example of setting of a contact detection region.

FIG. 9 is a plan view of the operation dial showing an example of the setting of the contact detection region. In FIG. 9, a hatched region is the contact detection region.

As shown in FIG. 9, two contact detection regions Z1 and Z2 are set on the top surface of the operation dial 110. The two contact detection regions Z1 and Z2 are set to have the same shape and the same area. Further, the two contact detection regions Z1 and Z2 are set symmetrically in the front-rear direction with respect to the center of the operation dial 110. The contact detection region Z1 to be set in the front direction is set as a first contact detection region Z1, and the contact detection region Z2 to be set in the rear direction is set as a second contact detection region Z2. The first contact detection region Z1 is set as a region that detects the contact with a region on the front side of the center of the operation dial 110. The second contact detection region Z2 is set as a region that detects the contact with a region on the rear side of the center of the operation dial 110.

<Touch Sensor>

The touch sensor 130 individually detects the contact with the first contact detection region Z1 and the second contact detection region Z2.

<Data Memory>

The data memory 64 is an example of a first storage unit and a second storage unit. The data memory 64 stores the information on the exposure mode required to be set and the information on the operation target required to be set.

[Information on Exposure Mode Required to be Set]

The information on the exposure mode required to be set refers to information on the exposure mode required to be set according to the detection result of the touch sensor 130. The information on the exposure mode required to be set includes information on the exposure mode to be set by default, information on the exposure mode to be set in a case where the first contact detection region Z1 is touched, information on the exposure mode to be set in a case where the second contact detection region Z2 is touched, and information on the exposure mode to be set in a case where the first contact detection region Z1 and the second contact detection region Z2 are simultaneously touched. The exposure mode to be set by default refers to an exposure mode to be set normally and an exposure mode to be set before the top surface of the operation dial 110 is touched to switch the exposure mode. The information on the exposure mode required to be set is, for example, generated in a table format as an exposure mode setting table and is stored in the data memory 64.

In the digital camera 1 of the embodiment, the exposure mode required to be set is set as follows.

(1) Exposure mode to be set by default: program mode
(2) Mode to be set in the case where the first contact detection region Z1 is touched alone: shutter speed priority mode
(3) Mode to be set in the case where the second contact detection region Z2 is touched alone: aperture priority mode
(4) Mode to be set in the case where the first contact detection region Z1 and the second contact detection region Z2 are simultaneously touched: manual mode

[Information on Operation Target Required to be Set]

The information on the operation target required to be set refers to an operation target required to be set of the operation dial 110 according to the set exposure mode. In the case of the digital camera 1 of the embodiment, the information on the operation target required to be set includes information on the operation target required to be set in a case where the program mode is set, information on the operation target required to be set in a case where the shutter speed priority mode is set, information on the operation target required to be set in a case where the aperture priority mode is set, and information on the operation target required to be set in a case where the manual mode is set. The information on the operation target required to be set is, for example, generated in a table format as an operation target setting table and is stored in the data memory 64.

In the digital camera 1 of the embodiment, the operation target required to be set is set as follows.

(1) Program mode: program shift
(2) Shutter speed priority mode: shutter speed
(3) Aperture priority mode: F-number
(4) Manual mode: shutter speed or F-number In the case of the manual mode, the operation target of the operation dial 110 is set to the shutter speed or the F-number. Which one is set is set by the user in advance. This setting is performed on the menu screen. In a case where the operation target of the operation dial 110 is set to the shutter speed, the setting of the F-number is performed by the rear command dial 41. Similarly, in a case where the operation target of the operation dial 110 is set to the F-number, the setting of the shutter speed is performed by the rear command dial 41.

<Exposure Mode Setting Unit>

The exposure mode setting unit 150 sets the exposure mode based on the touch sensor 130. The exposure mode setting unit 150 sets the exposure mode with reference to the exposure mode setting table. The setting of the exposure mode is performed with a current exposure mode as the default and is performed as follows.

[Case where Current Exposure Mode is Program Mode]

In a case where it is detected that the first contact detection region Z1 is touched alone, the exposure mode is switched to the shutter speed priority mode. Further, in a case where it is detected that the second contact detection region Z2 is touched alone, the exposure mode is switched to the aperture priority mode. Further, in a case where it is detected that the first contact detection region Z1 and the second contact detection region Z2 are simultaneously touched, the exposure mode is switched to the manual mode.

[Case where Current Exposure Mode is Shutter Speed Priority Mode]

In the case where it is detected that the first contact detection region Z1 is touched alone, the exposure mode is switched to the program mode. Further, in the case where it is detected that the second contact detection region Z2 is touched alone, the exposure mode is switched to the aperture priority mode. Further, in the case where it is detected that the first contact detection region Z1 and the second contact detection region Z2 are simultaneously touched, the exposure mode is switched to the manual mode.

[Case where Current Exposure Mode is Aperture Priority Mode]

In the case where it is detected that the first contact detection region Z1 is touched alone, the exposure mode is switched to the shutter speed priority mode. Further, in the case where it is detected that the second contact detection region Z2 is touched alone, the exposure mode is switched to the program mode. Further, in the case where it is detected that the first contact detection region Z1 and the second contact detection region Z2 are simultaneously touched, the exposure mode is switched to the manual mode.

[Case where Current Exposure Mode is Manual Mode]

In the case where it is detected that the first contact detection region Z1 is touched alone, the exposure mode is switched to the shutter speed priority mode. Further, in the case where it is detected that the second contact detection region Z2 is touched alone, the exposure mode is switched to the aperture priority mode. Further, in the case where it is detected that the first contact detection region Z1 and the second contact detection region Z2 are simultaneously touched, the exposure mode is switched to the program mode.

In this manner, in the case where the exposure mode is shifted from the program mode to another exposure mode, the exposure mode returns to the program mode in a case where the same contact detection region is touched and shifts to another exposure mode in a case where another contact detection region is touched.

The function of the exposure mode setting unit 150 is provided as one function of the system controller 80. That is, the microcomputer configuring the system controller 80 executes a predetermined program to provide the function of the exposure mode setting unit 150 as one function of the system controller 80.

The information on the exposure mode set by the exposure mode setting unit 150 is stored in the data memory 64.

<Operation Target Setting Unit>

The operation target setting unit 152 sets the operation target of the operation dial 110 based on the exposure mode set by the exposure mode setting unit 150. The operation target setting unit 152 sets the operation target of the operation dial 110 with reference to the operation target setting table.

In the case where the exposure mode is set to the program mode, the operation target setting unit 152 sets the operation target of the operation dial 110 to the program shift.

In the case where the exposure mode is set to the shutter speed priority mode, the operation target setting unit 152 sets the operation target of the operation dial 110 to the shutter speed.

In the case where the exposure mode is set to the aperture priority mode, the operation target setting unit 152 sets the operation target of the operation dial 110 to the F-number.

In the case where the exposure mode is set to the manual mode, the operation target setting unit 152 sets the operation target of the operation dial 110 to the shutter speed or the F-number based on the setting of the user.

The function of the operation target setting unit 152 is provided as one function of the system controller 80. That is, the microcomputer configuring the system controller 80 executes a predetermined program to provide the function of the operation target setting unit 152 as one function of the system controller 80.

The information on the operation target of the operation dial 110 set by the operation target setting unit 152 is stored in the data memory 64.

<Setting Change Unit>

The setting change unit 154 changes the setting of the operation target set by the operation target setting unit 152 based on the operation of the operation dial 110.

For example, in the case where the operation target of the operation dial 110 is set to the program shift, the setting change unit 154 changes the combination of the F-number and the shutter speed in response to the operation of the operation dial 110. For example, in a case where the operation dial 110 is rotationally operated counterclockwise, the setting change unit 154 changes the combination to a combination in which the shutter speed increases (=combination in which the F-number decreases) according to the rotation amount of the operation dial 110. On the other hand, in a case where the operation dial 110 is rotationally operated clockwise, the setting change unit 154 changes the combination to a combination in which the shutter speed decreases (=combination in which the F-number increases) according to the rotation amount of the operation dial 110.

Further, for example, in the case where the operation target of the operation dial 110 is set to the shutter speed, the setting change unit 154 changes the shutter speed in response to the operation of the operation dial 110. For example, in the case where the operation dial 110 is rotationally operated counterclockwise, the setting change unit 154 increases the shutter speed according to the rotation amount of the operation dial 110. On the other hand, in the case where the operation dial 110 is rotationally operated clockwise, the setting change unit 154 decreases the shutter speed according to the rotation amount of the operation dial 110.

Further, for example, in the case where the operation target of the operation dial 110 is set to the F-number, the setting change unit 154 changes the F-number in response to the operation of the operation dial 110. For example, in the case where the operation dial 110 is rotationally operated counterclockwise, the setting change unit 154 decreases the F-number (open aperture) according to the rotation amount of the operation dial 110. On the other hand, in the case where the operation dial 110 is rotationally operated clockwise, the setting change unit 154 increases the F-number (close aperture) according to the rotation amount of the operation dial 110.

The function of the setting change unit 154 is provided as one function of the system controller 80. That is, the microcomputer configuring the system controller 80 executes a predetermined program to provide the function of the setting change unit 154 as one function of the system controller 80.

<Dial-Display>

The dial-display 132 displays the information on the operation target of the operation dial 110 set in the case where each contact detection region is touched alone for each contact detection region.

Figure 10:
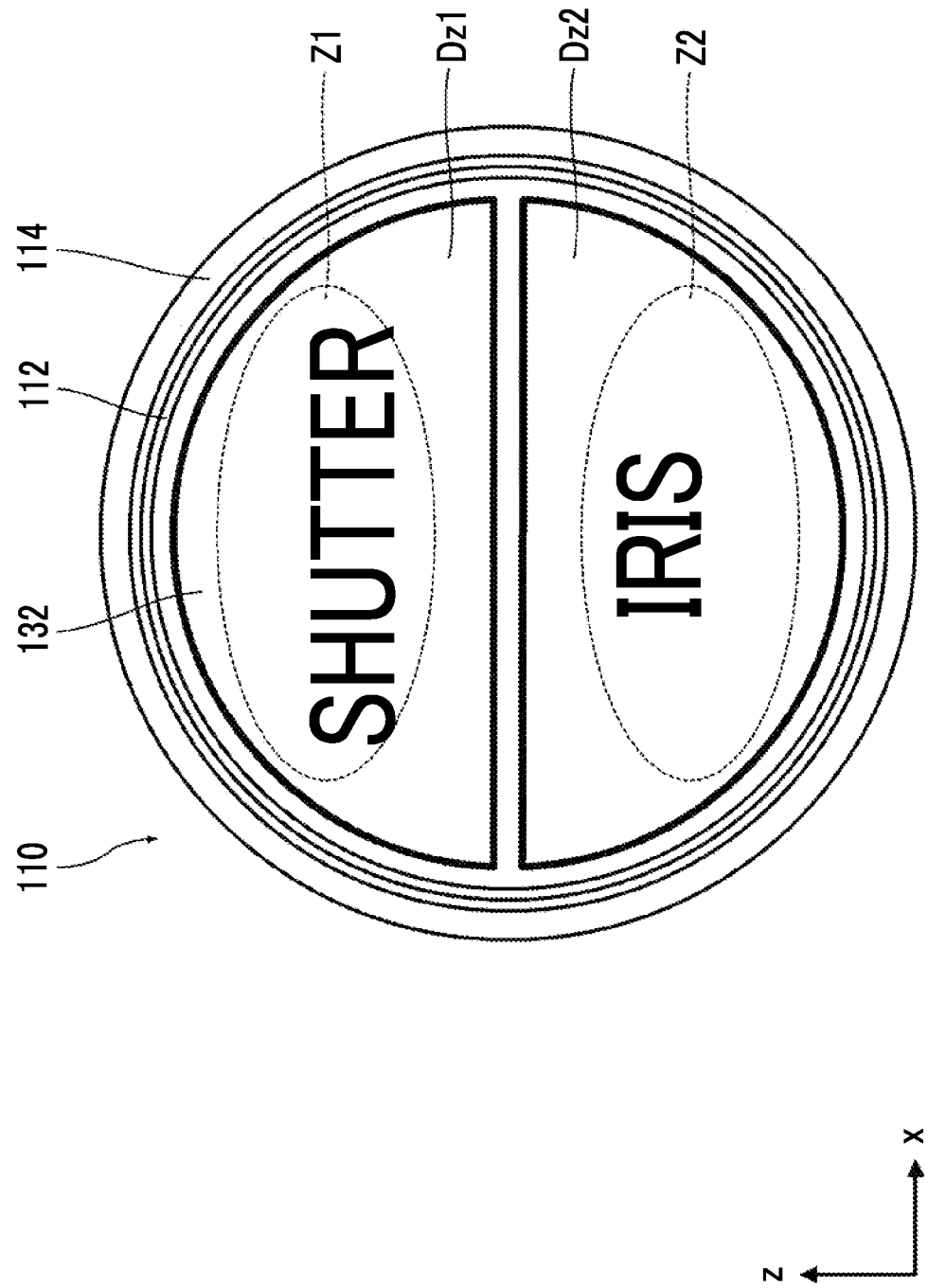
FIG. 10 is a plan view of the operation dial showing an example of a display on a dial-display.
(A), (B), (C), and (D) of FIG. 11 are views of examples of switching of the displays on the dial-display and a sub-display.

FIG. 10 is a plan view of the operation dial showing an example of the display on the dial-display.

As shown in FIG. 10, a first display region Dz1 and a second display region Dz2 are set on the display region of the dial-display 132. The first display region Dz1 and the second display region Dz2 are configured to have the same shape and the same area and are disposed symmetrically in the front-rear direction with respect to the center of the operation dial 110. In the digital camera 1 of the embodiment, both the first display region Dz1 and the second display region Dz2 are set as semicircular regions.

The first display region Dz1 is a region corresponding to the first contact detection region Z1. In this example, the first contact detection region Z1 is set inside the first display region Dz1. In a case where the first contact detection region Z1 is touched, the first display region Dz1 is inevitably touched.

The second display region Dz2 is a region corresponding to the second contact detection region Z2. In this example, the second contact detection region Z2 is set inside the second display region Dz2. In a case where the second contact detection region Z2 is touched, the second display region Dz2 is inevitably touched.

The exposure mode to be set in the case where the first contact detection region Z1 is touched alone is the shutter speed priority mode. The operation target of the operation dial 110 to be set in the case where the shutter speed priority mode is set is the shutter speed. Therefore, the first display region Dz1 displays a character of "SHUTTER" representing the shutter speed in the semicircular frame as the information on the operation target of the operation dial 110 to be set in the case where the first contact detection region Z1 is touched alone.

The exposure mode to be set in the case where the second contact detection region Z2 is touched alone is the aperture priority mode. The operation target of the operation dial 110 to be set in the case where the aperture priority mode is set is the F-number. Therefore, the second display region Dz2 displays a character of "IRIS" representing the aperture in the semicircular frame as the information on the operation target of the operation dial 110 to be set in the case where the second contact detection region Z2 is touched alone.

In the display on the dial-display 132, the display forms of the first display region Dz1 and the second display region Dz2 are switched according to the set exposure mode. In the digital camera 1 of the embodiment, the display on the corresponding display region is inverted according to the set exposure mode. That is, colors of the character and the background are inverted.

Figure 11:
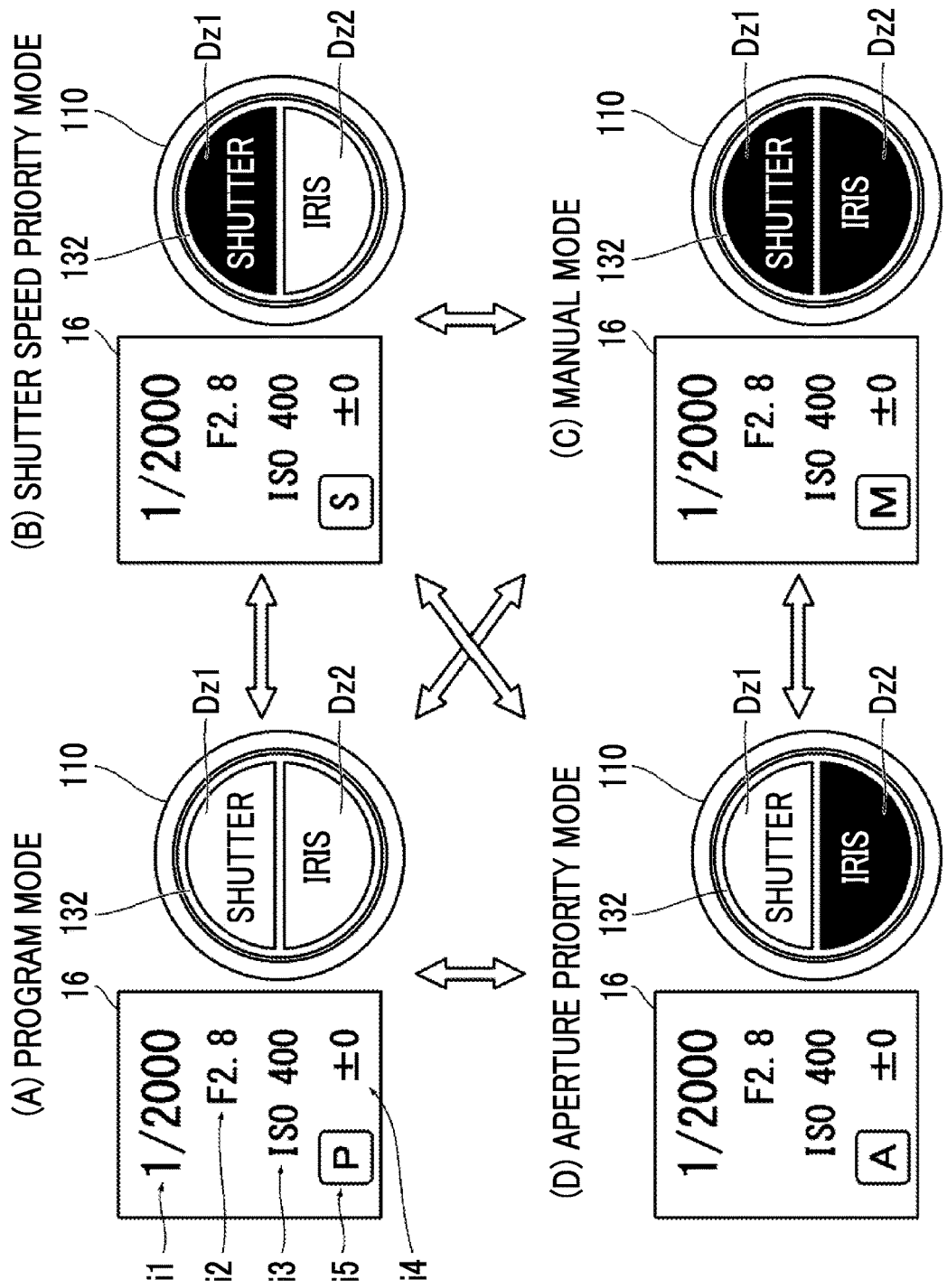

(A), (B), (C), and (D) of FIG. 11 are views of examples of switching of the displays on the dial-display and the sub-display. (A) of FIG. 11 shows an example of the displays in the case where the exposure mode is set to the program mode. (B) of FIG. 11 shows an example of the displays in the case where the exposure mode is set to the shutter speed priority mode. (C) of FIG. 11 shows an example of the displays in the case where the exposure mode is set to the manual mode. (D) of FIG. 11 shows an example of the displays, in the case where the exposure mode is set to the aperture priority mode.

As shown in (A) of FIG. 11, in the case of the program mode, the operation target information is displayed in a black character on a white background on both the first display region Dz1 and the second display region Dz2.

As shown in (B) of FIG. 11, in a case where the first contact detection region Z1 is touched to set the exposure mode to the shutter speed priority mode, only the display in the first display region Dz1 is inverted. That is, the operation target information is displayed in a white character on a black background.

As shown in (C) of FIG. 11, in a case where the first contact detection region Z1 and the second contact detection region Z2 are simultaneously touched to set the exposure mode to the manual mode, both displays of the first display region Dz1 and the second display region Dz2 are inverted. That is, the operation target information is displayed in the white character on the black background in both cases.

As shown in (D) of FIG. 11, in a case where the second contact detection region Z2 is touched to set the exposure mode to the aperture priority mode, only the display in the second display region Dz2 is inverted. That is, the operation target information is displayed in the white character on the black background.

In this manner, in the display on the dial-display 132, the display form thereof is switched according to the set exposure mode. Accordingly, it is possible to grasp the set exposure mode at a glance from the display on the dial-display 132.

<Dial Display Control Unit>

The dial display control unit 156 controls the display on the dial-display 132 through a dial-display drive unit 160. That is, as shown in FIG. 10, the display on the dial-display 132 is controlled such that the predetermined information is displayed in a predetermined layout. Further, the dial display control unit 156 controls the display on the dial-display 132 based on the exposure mode to be set by the exposure mode setting unit 150. That is, as shown in (A), (B), (C), and (D) of FIG. 11, the display on the dial-display 132 is controlled such that the display form of each of the display regions Dz1 and Dz2 is switched according to the set exposure mode.

The function of the dial display control unit 156 is provided as one function of the system controller 80. That is, the microcomputer configuring the system controller 80 executes a predetermined program to provide the function of the dial display control unit 156 as one function of the system controller 80.

<Sub-Display>

The sub-display 16 is an example of a setting display section. The sub-display 16 mainly displays the setting contents of the digital camera 1. As shown in (A), (B), (C), and (D) of FIG. 11, in the digital camera 1 of the embodiment, shutter speed information i1, F-number information i2, international organization for standardization sensitivity (ISO) information i3, exposure correction amount information i4, and exposure mode information i5 are displayed as the setting contents of the camera. Each piece of information is displayed in a layout set in advance.

(A), (B), (C), and (D) of FIG. 11 show cases where the shutter speed is 1/2000 second, the F-number is F 2.8, the ISO sensitivity is ISO 400, and the exposure correction amount is ±0 (no exposure correction).

The exposure mode information i5 is displayed in an icon format. The icon is expressed in a form in which one alphabet character representing each exposure mode is displayed in a rectangular frame. The one alphabet character representing each exposure mode is "P" for the program mode, "S" for the shutter speed priority mode, "A" for the aperture priority mode, and "M" for the manual mode.

It is possible to confirm the main setting contents related to the imaging in addition to a currently set exposure mode by confirming the display on the sub-display 16.

<Sub-display Display Control Unit>

The sub-display display control unit 158 is an example of a setting display control unit. The sub-display display control unit 158 controls the display on the sub-display 16 through the sub-display drive unit 72. The sub-display display control unit 158 acquires the information on each item to be displayed on the sub-display 16 as setting information and displays the information on the sub-display 16 in the layout set in advance.

The function of the sub-display display control unit 158 is provided as one function of the system controller 80. That is, the microcomputer configuring the system controller 80 executes a predetermined program to provide the function of the sub-display display control unit 158 as one function of the system controller 80.

[Setting Method of Exposure Mode]

Next, a setting method of the exposure mode in the digital camera 1 of the embodiment configured as described above will be described.

Figure 12:
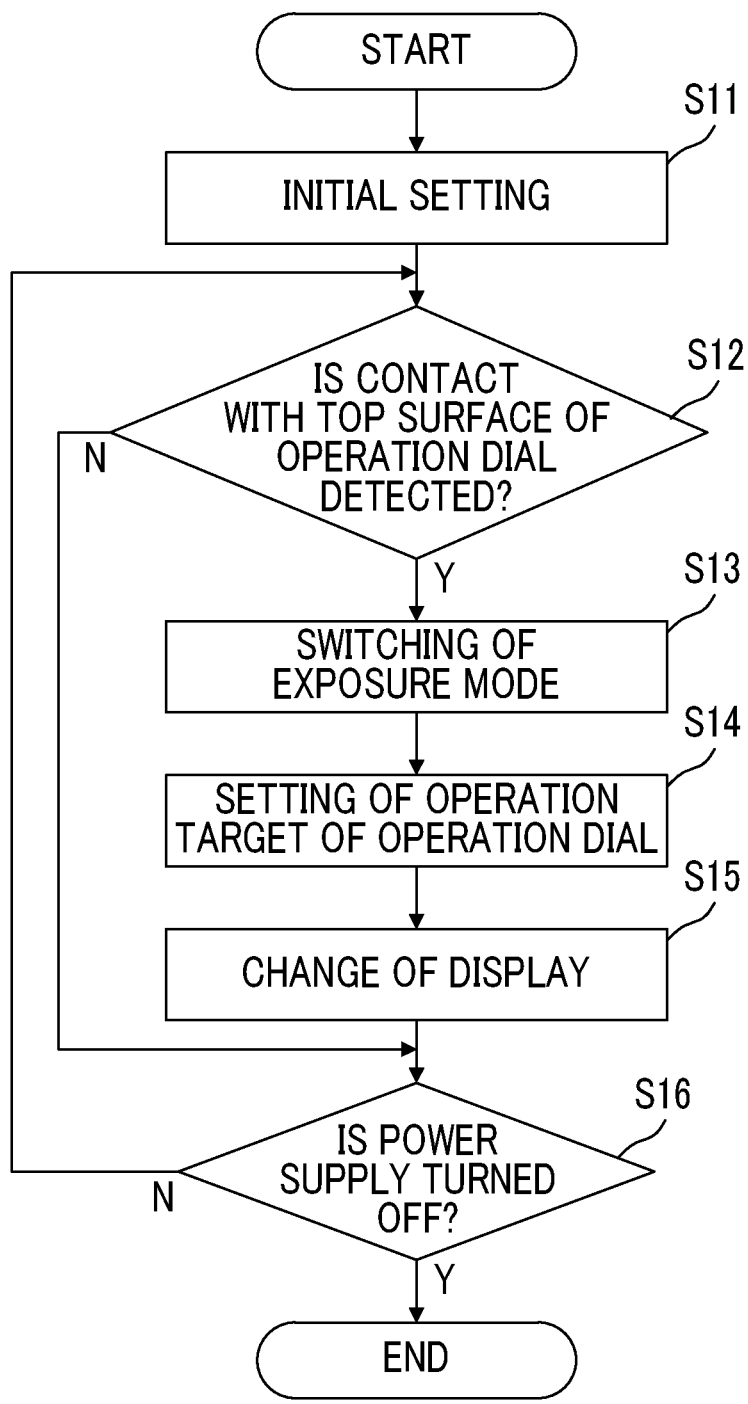
FIG. 12 is a flowchart showing a procedure of setting processing of the exposure mode.
(A), (B), (C), and (D) of FIG. 13 are views of a modification example of the sub-display.

FIG. 12 is a flowchart showing a procedure of setting processing of the exposure mode.

In the case where the power supply of the digital camera 1 is turned ON, an initial setting is first performed (step S11). The initial setting is processing of resetting a previously set exposure mode. The operation target of the operation dial 110 is reset in conjunction with the setting of the exposure mode. The previously set exposure mode refers to an exposure mode set at the time of the power supply OFF. The initial setting is performed by reading the information on the previously set exposure mode.

In a case where the exposure mode is set due to the initial setting, the information on the set exposure mode is displayed on the sub-display 16 (refer to FIG. 11). Further, the dial-display 132 is displayed in a display form according to the set exposure mode (refer to FIG. 11).

The imaging is possible by completing the initial setting. Thereafter, it is determined whether the contact with the top surface of the operation dial 110 is detected (step S12). This detection is performed based on an output of the touch sensor 130.

In a case where the contact with the top surface of the operation dial 110 is detected, processing of switching the exposure mode is performed (step S13).

In a case where the current exposure mode is the program mode, the exposure mode is switched to the shutter speed priority mode in a case where the contact with the first contact detection region Z1 is detected. The exposure mode is switched to the aperture priority mode in a case where the contact with the second contact detection region Z2 is detected. Further, the exposure mode is switched to the manual mode in a case where the contact with the first contact detection region Z1 and the second contact detection region Z2 is simultaneously detected.

In a case where the current exposure mode is the shutter speed priority mode, the exposure mode is switched to the program mode in the case where the contact with the first contact detection region Z1 is detected. The exposure mode is switched to the aperture priority mode in the case where the contact with the second contact detection region Z2 is detected. Further, the exposure mode is switched to the manual mode in the case where the contact with the first contact detection region Z1 and the second contact detection region Z2 is simultaneously detected.

In a case where the current exposure mode is the aperture priority mode, the exposure mode is switched to the shutter speed priority mode in the case where the contact with the first contact detection region Z1 is detected. The exposure mode is switched to the program mode in the case where the contact with the second contact detection region Z2 is detected. Further, the exposure mode is switched to the manual mode in the case where the contact with the first contact detection region Z1 and the second contact detection region Z2 is simultaneously detected.

In a case where the current exposure mode is the manual mode, the exposure mode is switched to the shutter speed priority mode in the case where the contact with the first contact detection region Z1 is detected. The exposure mode is switched to the aperture priority mode in the case where the contact with the second contact detection region Z2 is detected. Further, the exposure mode is switched to the program mode in the case where the contact with the first contact detection region Z1 and the second contact detection region Z2 is simultaneously detected.

In a case where the exposure mode is set, the operation target of the operation dial 110 is set (step S14). The operation target of the operation dial 110 is set according to the exposure mode. In the case where the set exposure mode is the program mode, the program shift is set as the operation target. In the case where the set exposure mode is the shutter speed priority mode, the shutter speed is set as the operation target. In the case where the set exposure mode is the aperture priority mode, the F-number is set as the operation target. In the case where the set exposure mode is the manual mode, the shutter speed or the F-number is set as the operation target.

Further, in the case where the exposure mode is set, the display on the dial-display 132 is changed (step S15). For example, in the case where the set exposure mode is the program mode, the displays of both the first display region Dz1 and the second display region Dz2 on the dial-display 132 are changed in the black character on the white background as shown in (A) of FIG. 11. In the case where the set exposure mode is the shutter speed priority mode, the display of the first display region Dz1 on the dial-display 132 is changed in the white character on the black background and the display of the second display region Dz2 on the dial-display 132 is changed in the black character on the white background as shown in (B) of FIG. 11. Further, in the case where the set exposure mode is the manual mode, the displays of both the first display region Dz1 and the second display region Dz2 on the dial-display 132 are changed in the white character on the black background as shown in (C) of FIG. 11. In the case where the set exposure mode is the aperture priority mode, the display of the first display region Dz1 on the dial-display 132 is changed in the black character on the white background and the display of the second display region Dz2 on the dial-display 132 is changed in the white character on the black background as shown in (D) of FIG. 11.

The switching of the exposure mode has completed in a series of steps. Accordingly, the imaging is possible under a new exposure mode. Thereafter, it is determined whether the power supply is turned OFF (step S16). In the case where the power supply is turned OFF, the processing ends.

In this manner, with the digital camera 1 of the embodiment, the exposure mode is switched by the operation of touching the top surface of the operation dial 110. Accordingly, it is possible to easily and quickly switch to the target exposure mode. Further, since the operation target of the operation dial 110 is also switched in conjunction with the switching of the exposure mode, it is possible to realize good operability. Further, since there is no need to separately install a mode dial or the like, it is possible to simplify the configuration of the camera.

Modification Example

«Mode to be Set»

The case of setting the exposure mode of the camera is described as an example in the above-mentioned embodiment, but the application of the invention is not limited thereto. It is also possible to apply the invention to a case where other modes are set.

The settable exposure modes are four modes of the program mode, the shutter speed priority mode, the aperture priority mode, and the manual mode in the above-mentioned embodiment, but the type and the number of the settable exposure modes are not limited to this. In addition, for example, a full auto mode and the like may be set. The full auto mode refers to a mode in which the camera automatically set all the items. In the case of the full auto mode, for example, the operation of the operation dial is invalidated.

«Operation Target of Operation Dial»

The operation target of the operation dial is set according to the mode. The operation target of the operation dial is not necessarily set for each mode. It is possible to invalidate the operation of the operation dial according to the mode.

«Installation Position of Operation Dial»

The operation dial is installed on the top surface of the camera body in the above-mentioned embodiment, but a position at which the operation dial is installed is not limited thereto. In the case where the operation dial is disposed on the end portion of the grip portion side on the top surface of the camera body as in the digital camera of the above-mentioned embodiment, it is possible for the user to operate the operation dial while gripping the camera body.

«Display on Sub-display»

<Form of Displaying Only Information on Set Exposure Mode>

It is possible to set the item to be displayed on the sub-display as appropriate according to the function provided in the camera. It is preferable to display at least the information on the mode to be set by touching the top surface of the operation dial 110.

Figure 13:
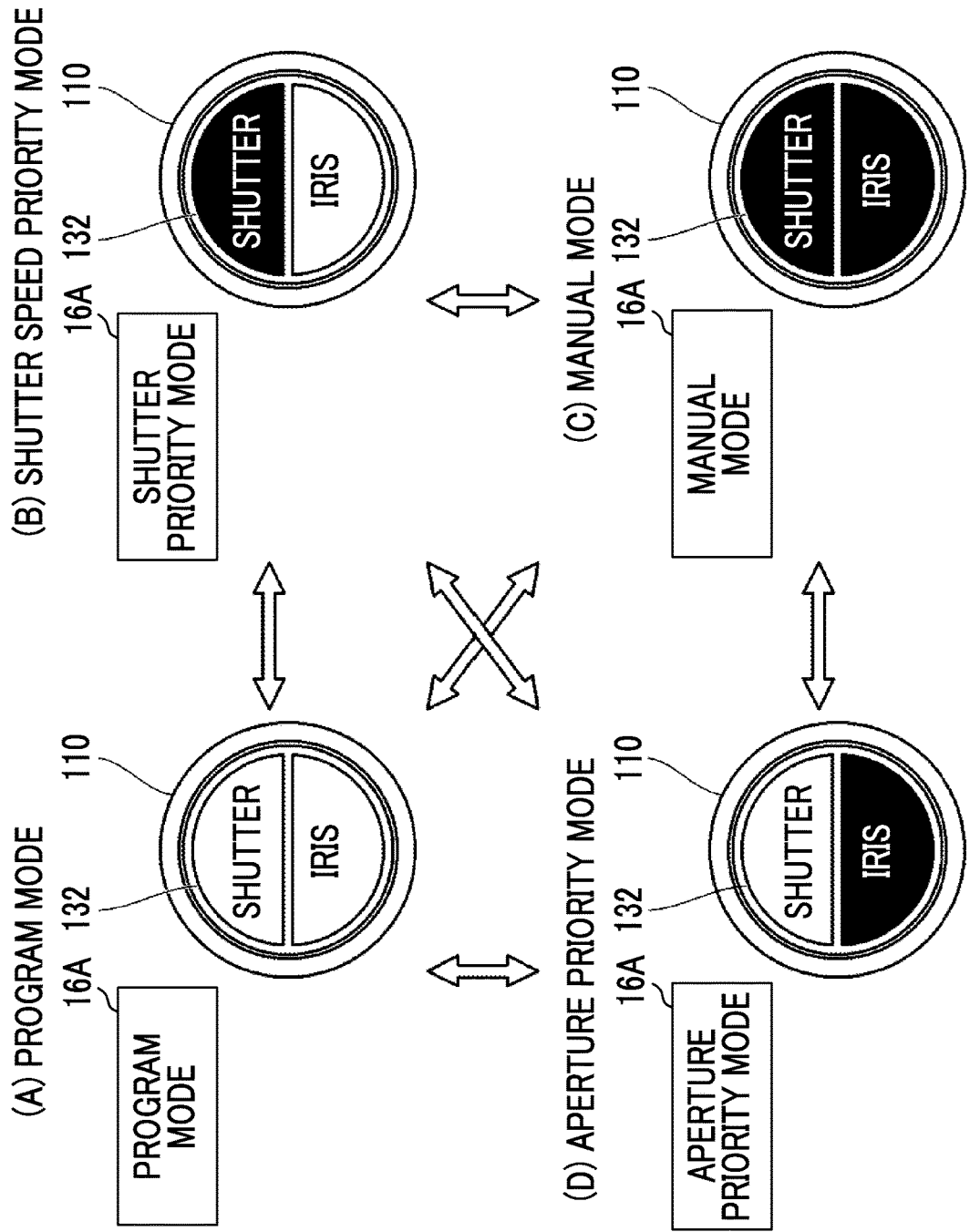

(A), (B), (C), and (D) of FIG. 13 are views of a modification example of the sub-display.

As shown in (A), (B), (C), and (D) of FIG. 13, the sub-display 16A may display only the information on the set exposure mode.

(A) of FIG. 13 shows an example of the display in the case where the exposure mode is set to the program mode. In this case, the sub-display 16A displays a character of "PROGRAM MODE" as the information indicating that the set exposure mode is the program mode.

(B) of FIG. 13 shows an example of the display in the case where the exposure mode is set to the shutter speed priority mode. In this case, the sub-display 16A displays a character of "SHUTTER PRIORITY MODE" as the information indicating that the set exposure mode is the shutter speed priority mode.

(C) of FIG. 13 shows an example of the display in the case where the exposure mode is set to the manual mode. In this case, the sub-display 16A displays a character of "MANUAL MODE" as the information indicating that the set exposure mode is the manual mode.

(D) of FIG. 13 shows an example of the display in the case where the exposure mode is set to the aperture priority mode. In this case, the sub-display 16A displays a character of "APERTURE PRIORITY MODE" as the information indicating that the set exposure mode is the aperture priority mode.

It is preferable to dispose the sub-display configuring the setting display section near the operation dial. Here, the "near" refers to a distance relationship to the extent that the sub-display and the operation dial are disposed adjacent to each other as shown in FIGS. 11 and 13. It is possible to provide better operability by disposing the sub-display near the operation dial. That is, since the setting can be confirmed right near the operation dial, it is possible to reduce movement of line of sight and thus to provide good operability without stress.

<Display that Makes Item to be Changed in Setting by Operation Dial Visually Recognizable on Sub-display>

It is preferable to display at least the information on a setting value of the item to be set by the operation dial 110 on the sub-display 16. In the above-mentioned embodiment, since the shutter speed and the F-number are set by the operation dial 110, it is preferable to display at least the pieces of information on the shutter speed and the F-number on the sub-display 16 as the setting information of the camera.

Further, in a case where the information to be displayed on the sub-display 16 includes the information on the setting value of the item to be set by the operation dial 110, it is preferable to display the setting value of the item to be changed in the setting by the operation dial 110 at the present time so as to be distinguishable from other display items. For example, in a case where the item to be changed in the setting by the operation dial 110 at the present time is the shutter speed, the setting value of the shutter speed is displayed so as to be distinguishable from the setting values of other items. For example, a mark indicating the item to be changed in the setting may be displayed in front of the setting value, the setting value may be surrounded by a frame, or the size of the character to be displayed may be changed to display other items in a distinguishable manner.

(A), (B), (C), and (D) of FIG. 14 are views of examples of the display on the sub-display that makes the item to be changed in the setting by the operation dial distinguishable from other items.

(A) of FIG. 14 shows an example of the display in the case where the exposure mode is set to the program mode. (B) of FIG. 14 shows an example of the display in the case where the exposure mode is set to the shutter speed priority mode. (C) of FIG. 14 shows an example of the display in the case where the exposure mode is set to the manual mode. (D) of FIG. 14 shows an example of the display in the case where the exposure mode is set to the aperture priority mode.

In the case of the program mode, the operation target of the operation dial 110 is set to the program shift. In this case, the combination of the shutter speed and the F-number is changed in response to the operation of the operation dial 110. Therefore, the sub-display 16 displays predetermined marks m2 in front of the display position of the shutter speed information i1 and in front of the display position of the F-number information i2 as shown in (A) of FIG. 14. The marks m2 are configured of hollow triangles and are respectively displayed so as to indicate the shutter speed information i1 and the F-number information i2.

In the case of the shutter speed priority mode, the operation target of the operation dial 110 is set to the shutter speed. In this case, the sub-display 16 displays a predetermined mark m1 in front of the display position of the shutter speed information i1 as shown in (B) of FIG. 14. The mark m1 is configured of a black triangle and is displayed so as to indicate the shutter speed information i1.

In the case of the manual mode, the operation target of the operation dial 110 is set to the shutter speed or the F-number. In the case where the operation target of the operation dial 110 is set to the shutter speed, the sub-display 16 displays the predetermined mark m1 in front of the display position of the shutter speed information i1 as shown in (C) of FIG. 14. The mark m1 is configured of the black triangle and is displayed so as to indicate the shutter speed information i1. In the case where the operation target of the operation dial 110 is set to the shutter speed, the F-number is set as the operation target in the rear command dial 41. In this case, the sub-display 16 displays the predetermined mark m2 in front of the display position of the F-number information i2 as shown in (C) of FIG. 14. The mark m2 is configured of the hollow triangle and is displayed so as to indicate the F-number information i2.

In the case of the aperture priority mode, the operation target of the operation dial 110 is set to the F-number. In this case, the sub-display 16 displays the predetermined mark m1 in front of the display position of the F-number information i2 as shown in (D) of FIG. 14. The mark m1 is configured of the black triangle and is displayed so as to indicate the F-number information i2.

The difference between the mark m1 and the mark m2 is whether there is an item to be changed in the setting directly by the operation dial 110. The mark m1 is displayed in a case where there is the item to be changed in the setting directly by operating the operation dial 110, and the mark m2 is displayed in a case where there is an item to be changed in the setting indirectly or by another operation dial.

In this manner, it is possible to further enhance the operability by displaying the setting value of the item to be changed in the setting by the operation dial 110 at the present time so as to be distinguishable from other display items.

The switching of the display on the sub-display 16 is performed in conjunction with the switching of the display on the dial-display 132.

«Display on Dial-display»

The information on the operation target of the operation dial to be set in the case where each contact detection region is touched alone is displayed on the dial-display in the above-mentioned embodiment, but the information to be displayed on the dial-display is not limited thereto.

(A), (B), (C), and (D) of FIG. 15 are views of the modification example of the display on the dial-display. (A) of FIG. 15 shows an example of the display in the case where the exposure mode is set to the program mode, (B) of FIG. 15 shows an example of the display in the case where the exposure mode is set to the shutter speed priority mode, (C) of FIG. 15 shows an example of the display in the case where the exposure mode is set to the manual mode, and (D) of FIG. 15 shows an example of the display in the case where the exposure mode is set to the aperture priority mode.

The examples shown in (A), (B), (C), and (D) of FIG. 15 display the current setting value of the operation target of the operation dial to be set in the case where each contact detection region is touched alone.

The information on the operation target of the operation dial is displayed on the dial-display in the above-mentioned embodiment, but the information may be displayed by being printed or engraved on the top surface of the operation dial.

«Contact Detection Unit»

The contact detection unit is configured of the touch sensor in the above-mentioned embodiment, but the configuration of the contact detection unit is not limited thereto. Further, the contact with each contact detection region is detected by one touch sensor in the above-mentioned embodiment, but the touch sensor may be provided for each contact detection region to detect the contact.

«Modification Example of Contact Detection»

It is preferable to provide a so-called dead zone for the detection of the contact. That is, it is preferable not to detect instantaneous finger contact. In order to provide the dead zone, for example, the contact is detected at regular time interval. In this case, it is determined whether the contact is continuously detected to determine the presence or absence of the contact. In a case where the contact is continuously detected, the contact is determined to be present. In the case of the instantaneous contact, since the contact is not continuously detected, the detection can be eliminated. Further, even in the case where the finger is instantaneously released, it can be recognized that the contact is continued as long as the finger is touched before the next detection. In this manner, the operation can be performed more stably by determining also duration of the contact and responding with hysteresis.

Further, it may be truly recognized that the contact is made in a case where the contact detection region is touched for a certain period of time or more. That is, the contact for a certain period of time or more is detected, and the mode is switched. For example, the contact for one second or more is detected, and the mode is switched. Accordingly, it is possible to prevent the mode from being switched carelessly.

«Contact Detection Region»

The contact detection region to be set on the top surface of the operation dial is set according to the number of modes to be set. The number of modes to be set is two or more.

It is possible to grasp the position of the contact detection region with an interval of the fingers even without viewing the top surface of the operation dial by symmetrically disposing two contact detection regions with respect to the center of the operation dial as in the digital camera of the above-mentioned embodiment. Accordingly, it is possible to operate the switching of the mode even in a situation where surroundings are dark. Further, it is also possible to operate the switching of the mode while the electronic view finder is viewed.

«Detection of Rotation Operation of Operation Dial»

The rotation of the operation dial is detected by the rotary encoder in the above-mentioned embodiment, but the configuration of detecting the rotation of the operation dial is not limited thereto. In addition, for example, publicly known rotation detection means, which uses a rotary brush or the like, may also be employed.

Further, the click mechanism of the command dial is formed of the click groove-metal plate and the click balls in the above-mentioned embodiment, but the configuration of the click mechanism is not limited thereto. In addition, publicly known click mechanism, which uses a leaf spring or the like, may also be employed.

«Form of Returning to Default Mode»

In the above-mentioned embodiment, in the case where the program mode which is the default mode is shifted to another exposure mode, the same contact detection region as at the time of the switching is touched again to return to the program mode which is the default mode. However, a form of returning to the default mode is not limited thereto. It is possible to employ various forms such as a configuration of returning to the default mode by touching the same contact detection region as at the time of the switching continuously for a certain period of time or more, a configuration of returning to the default mode by simultaneously touching the first contact detection region and the second contact detection region continuously for a certain period of time or more, a configuration of returning to the default mode by tapping the same contact detection region as at the time of the switching a certain number of times, and a configuration of returning to the default mode by simultaneously tapping the first contact detection region and the second contact detection region a certain number of times. The "tap" refers to an operation of hitting a detection surface of the contact.

Second Embodiment

In a digital camera of an embodiment, in a case where the top surface of the operation dial is touched by the finger, the exposure mode is switched according to a touched position.

A difference from the digital camera of the above-mentioned first embodiment is only a detection form of the contact of the finger with the top surface of the operation dial. Therefore, only the switching of the exposure mode based on the detection of the contact of the finger with the top surface of the operation dial and the detection of the contact will be described.

[Detection of Contact]

The contact of the finger with the top surface of the operation dial 110 is detected by the touch sensor 130. The touch sensor 130 is an example of the contact detection unit and detects the contact of the finger with the top surface of the operation dial 110 and the contact position of the finger.

FIG. 16 is a conceptual view of detection of the contact position.

In FIG. 16, a hatched region TP surrounded by a broken line is a region where the contact is detected. This region is set as the contact detection region TP. The touch sensor 130 obtains a center of gravity position JP of the contact detection region TP and outputs the obtained center of gravity position JP as the contact position. The contact position is obtained as a position (x1,z1) on xz plane with the center of the touch sensor 130 (=rotation center of operation dial 110) as the origin.

[Setting of Exposure Mode]

A plurality of regions are set on the top surface of the operation dial 110, and the exposure mode required to be set is set for each region.

FIG. 17 is a view of an example of the region to be set on the top surface of the operation dial.

In FIG. 17, a circle region Tz indicated by the broken line is a contact detectable region of the touch sensor 130. In the digital camera of the embodiment, this contact detectable region Tz is divided into two in the front-rear direction (z direction). A region on the front side of the region divided into two is set as a first region Tz1, and a region on the rear side thereof is set as a second region Tz2. The shutter speed priority mode is set on the first region Tz1, and the aperture priority mode is set on the second region Tz2. The information on the mode set for each region is stored in the data memory 64 in a table format.

The exposure mode setting unit 150 sets the exposure mode based on the output of the touch sensor 130 with reference to the information stored in the data memory 64. That is, in a case where the contact with the top surface of the operation dial 110 is detected by the touch sensor 130 and the detected contact detection position JP belongs to the first region Tz1, the exposure mode is switched to the shutter speed priority mode. In a case where the detected contact detection position JP belongs to the second region Tz2, the exposure mode is switched to the aperture priority mode. A default exposure mode is the program mode. Therefore, in a state where the program mode is set, the exposure mode is switched to the shutter speed priority mode in a case where the contact with the first region Tz1 is detected, and the exposure mode is switched to the aperture priority mode in a case where the contact with the second region Tz2 is detected. Further, in a state where the exposure mode is set to the shutter speed priority mode, the exposure mode is switched to the program mode in a case where the contact with the first region Tz1 is detected, and the exposure mode is switched to the aperture priority mode in a case where the contact with the second region Tz2 is detected. Furthermore, in a state where the exposure mode is set to the aperture priority mode, the exposure mode is switched to the shutter speed priority mode in a case where the contact with the first region Tz1 is detected, and the exposure mode is switched to the program mode in a case where the contact with the second region Tz2 is detected.

In the case where the program mode is set, the operation target of the operation dial 110 is set to the program shift. Further, in the case where the shutter speed priority mode is set, the operation target of the operation dial 110 is set to the shutter speed. Further, in the case where the aperture priority mode is set, the operation target of the operation dial 110 is set to the F-number.

[Display on Dial-display]

FIG. 18 is a view of an example of the display on the dial-display.

As shown in FIG. 18, a region corresponding to the region set as the touch sensor 130 is displayed on the dial-display 132. That is, the region divided into two in the front-rear direction (z direction) is displayed. The region on the front side is set as the first display region Dz1, and the region on the rear side is set as the second display region Dz2. Both the first display region Dz1 and the second display region Dz2 are displayed as the regions surrounded by semicircular frames.

The information on the operation target of the operation dial 110 to be set in the case where the first region Tz1 is touched is displayed in the first display region Dz1. The operation target of the operation dial 110 to be set in the case where the first region Tz1 is touched is the shutter speed. Therefore, the character of "SHUTTER" representing the shutter speed is displayed in the semicircular frame in the first display region Dz1.

The information on the operation target of the operation dial 110 to be set in the case where the second region Tz2 is touched is displayed in the second display region Dz2. The operation target of the operation dial 110 to be set in the case where the second region Tz2 is touched is the F-number. Therefore, the character of "IRIS" representing the F-number is displayed in the semicircular frame in the second display region Dz2.

Here, the display on the dial-display 132 shown in FIG. 18 is an example of the display in the case where the exposure mode is the program mode. In a case where the first region Tz1 is touched to set the exposure mode to the shutter speed priority mode, the display in the first display region Dz1 is inverted. That is, the operation target information is displayed in the white character on the black background (refer to (B) of FIG. 11). On the other hand, in a case where the second region Tz2 is touched to set the exposure mode to the aperture priority mode, the display in the second display region Dz2 is inverted. That is, the operation target information is displayed in the white character on the black background (refer to (D) of FIG. 11).

In this manner, in the display on the dial-display 132, the display form is switched according to the set exposure mode. Accordingly, it is possible to grasp the set exposure mode at a glance from the display on the dial-display 132.

It is preferable to display the setting value of the item to be changed in the setting by the operation dial 110 at the present time so as to be distinguishable from other display items also for the display on the sub-display 16.

As described above, according to the digital camera of the embodiment, in the case where the top surface of the operation dial 110 is touched by the finger, the exposure mode is switched according to the touched position. Accordingly, it is possible to quickly switch the mode.

Modification Example

«Modification Example of Setting of Exposure Mode»

The top surface of the operation dial is divided into two and the shutter speed priority mode and the aperture priority mode are assigned to each region in the above-mentioned embodiment, but the regions to be set on the top surface of the operation dial and the modes to be assigned to each region are not limited thereto.

FIG. 19 is a view of another example of the region to be set on the top surface of the operation dial.

In the example shown in FIG. 19, three regions are set on the top surface of the operation dial 110. Specifically, a third region Tz3 is set in the center, and a region excluding the third region Tz3 is equally divided into two regions in the front-rear direction (z direction) and the first region Tz1 and the second region Tz2 are set.

The shutter speed priority mode is set for the first region Tz1, the aperture priority mode is set for the second region Tz2, and the manual mode is set for the third region Tz3.

In this case, the exposure mode is set to the shutter speed priority mode in the case where the first region Tz1 is touched, and the exposure mode is set to the aperture priority mode in the case where the second display region Dz2 is touched. Further, the exposure mode is set to the manual mode in a case where the third region Tz3 is touched.

«Modification Example of Detection of Contact Position»

The contact with the top surface of the operation dial 110 and the contact position are detected by the touch sensor 130 in the above-mentioned embodiment, but means for detecting the contact with the top surface of the operation dial 110 and the contact position is not limited thereto. The detection may be performed by using a sensor that detects a range and a distribution. A configuration capable of detecting the presence or absence of the contact and the contact position (may be any of a point, a center of gravity position of an area, a plurality of points, single or a plurality of coordinates to be calculated from the plurality of points or an area, and the like) may be employed.

«Other Modification Examples»

The examples described as the modification example of the above-mentioned first embodiment can be applied also to the digital camera of the embodiment.

Third Embodiment

In a digital camera of an embodiment, in the case where the top surface of the operation dial is touched by the finger, the exposure mode is switched according to the touched position. Further, in a case where the finger touching the top surface of the operation dial is moved, the mode of the camera is switched according to a movement direction of the finger.

A difference from the digital camera of the above-mentioned second embodiment is only that the movement of the finger is detected to switch the mode. Therefore, only the switching of the exposure mode based on the detection of the movement of the finger and the detection result will be described.

[Detection of Movement of Finger]

The movement of the finger on the top surface of the operation dial 110 is detected by the touch sensor 130. The touch sensor 130 is an example of the contact detection unit and detects the movement and the movement direction of the finger whose contact is detected. In a case where movement of the finger whose contact with the top surface of the operation dial 110 is detected is detected, the touch sensor 130 detects and outputs the movement direction of the finger.

[Setting of Exposure Mode]

The plurality of regions are set on the top surface of the operation dial 110, and the exposure mode required to be set is set for each region. Furthermore, the exposure mode required to be set is set for each movement direction.

The exposure mode to be set in the case where the contact is detected is the same as in the case of the above-mentioned second embodiment. That is, the region Tz is divided into the first region Tz1 and the second region Tz2, and the shutter speed priority mode is set for the first region Tz1. Further, the aperture priority mode is set for the second region Tz2.

The exposure mode to be set in the case where the movement of the finger is detected is as follows. That is, in a case where the movement direction is the rear direction (direction from the front side toward the rear side), the manual mode is set.

The information on the set mode is stored in the data memory 64 in a table format.

The exposure mode setting unit 150 sets the exposure mode based on the output of the touch sensor 130 with reference to the information stored in the data memory 64. That is, in the case where the contact with the top surface of the operation dial 110 is detected by the touch sensor 130 and the detected contact detection position JP belongs to the first region Tz1, the exposure mode is switched to the shutter speed priority mode. In the case where the detected contact detection position JP belongs to the second region Tz2, the exposure mode is switched to the aperture priority mode. Further, in a case where the movement of the touched finger is detected and the movement direction of the finger is the rear direction, the exposure mode is switched to the manual mode. The default exposure mode is the program mode.

In a state where the manual mode is set, the exposure mode is switched to the shutter speed priority mode in the case where the contact with the first region Tz1 is detected, and the exposure mode is switched to the aperture priority mode in the case where the contact with the second region Tz2 is detected. Further, in the case where the movement of the finger in the rear direction is detected, the exposure mode is switched to the program mode.

[Display on Dial-display]

The display on the dial-display 132 is the same as the digital camera of the above-mentioned second embodiment.

In the case where the exposure mode is set to the manual mode, the displays in the first display region Dz1 and the display in the second display region Dz2 are inverted. That is, the operation target information is displayed in the white character on the black background in both regions (refer to (C) of FIG. 11).

Modification Example

«Modification Example of Setting of Exposure Mode»

In the case where the finger is moved in the rear direction, the exposure mode is switched to the manual mode in the above-mentioned embodiment, but the examples of the movement direction of the finger and the exposure mode to be set for each movement direction are not limited thereto. For example, the switching to the manual mode can be set with respect to the movement in the front direction, the right direction, or the left direction. Further, other modes can be set.

Further, a combination of the movements in a plurality of continuous directions may be detected as the movement direction instead of a single direction. For example, a combination of the movements in the rear direction and the front direction may be detected, and the exposure mode may be switched to the manual mode.

«Detection of Movement Direction»

It is preferable to have a certain margin for the detection of the movement direction. For example, even though there is a movement in a diagonally rear direction, it is preferable to regard the movement as the movement in the rear direction in a case where the movement is within a certain angle range.

«Other Modification Examples»

The examples described as the modification example of the above-mentioned each embodiment can be applied also to the digital camera of the embodiment.

Fourth Embodiment

In a digital camera of an embodiment, in the case where the finger touching the top surface of the operation dial is moved, the exposure mode is switched according to the movement direction of the finger.

Therefore, in the digital camera of the embodiment, the exposure mode to be set for each movement direction is set.

The movement and the movement direction of the finger touching the top surface of the operation dial 110 are detected by the touch sensor 130. The touch sensor 130 is an example of the contact detection unit.

In the digital camera of the embodiment, the exposure mode to be set in each movement direction is as follows.
  (1) Default: program mode
  (2) Rear direction: shutter speed priority mode
  (3) Front direction: aperture priority mode
  (4) Right direction: manual mode
  The information on the mode set in each movement direction is stored in the data memory 64 in a table format.

The exposure mode setting unit 150 sets the exposure mode based on the output of the touch sensor 130 with reference to the information stored in the data memory 64.

In the state where the program mode is set, the exposure mode is switched to the shutter speed priority mode in a case where the movement of the finger in the rear direction is detected, and the exposure mode is switched to the aperture priority mode in a case where the movement of the finger in the front direction is detected. Further, the exposure mode is switched to the manual mode in a case where the movement of the finger in the right direction is detected.

In the state where the shutter speed priority mode is set, the exposure mode is switched to the program mode in the case where the movement of the finger in the rear direction is detected. Further, the exposure mode is switched to the aperture priority mode in the case where the movement of the finger in the front direction is detected, and the exposure mode is switched to the manual mode in the case where the movement of the finger in the right direction is detected.

In the state where the aperture priority mode is set, the exposure mode is switched to the shutter speed priority mode in the case where the movement of the finger in the rear direction is detected, and the exposure mode is switched to the program mode in the case where the movement of the finger in the front direction is detected. Further, the exposure mode is switched to the manual mode in the case where the movement of the finger in the right direction is detected.

In the state where the manual mode is set, the exposure mode is switched to the shutter speed priority mode in the case where the movement of the finger in the rear direction is detected, and the exposure mode is switched to the aperture priority mode in the case where the movement of the finger in the front direction is detected. Further, the exposure mode is switched to the program mode in the case where the movement of the finger in the right direction is detected.

Modification Example

«Modification Example of Setting of Exposure Mode»

The setting of the exposure mode described above is an example and is not limited thereto. Further, the exposure mode is switched to the program mode in a case where the finger is moved in the same direction as at the time of the switching in the above-mentioned embodiment, but the configuration of returning the exposure mode to the program mode is not limited thereto. For example, the exposure mode may return to the program mode in a case where the finger is moved in a specific direction.

Further, in a case where the movement of the finger in the specific direction is detected, the mode may be sequentially switched. For example, the exposure mode may be switched in order of (1) program mode, (2) shutter speed priority mode, (3) F-number priority mode, and (4) manual mode every time the movement in the rear direction is detected. In this case, the exposure mode may be switched in the reverse direction every time the movement in the front direction is detected.

«Other Modification Examples»

The examples described as the modification example of the above-mentioned each embodiment can be applied also to the digital camera of the embodiment.

«Setting Program»

A program causing a computer to realize the functions related to the setting of the exposure mode and the setting of the operation target of the operation dial can also be provided alone, for example, by being stored in a computer-readable recording medium as a setting program.

«Camera»

Further, the case where the invention is applied to the digital camera is described in the above-mentioned embodiment, but the application of the invention is not limited thereto. The invention may be applied similarly to a camera that uses a silver halide film. Further, the invention may also be applied to an electronic apparatus comprising the camera function.

Further, the case where the invention is applied to the lens-interchangeable camera is described in the above-mentioned embodiment, but the invention may also be applied similarly to a camera, which is integrated with a lens.

Furthermore, the case where the invention is applied to the non-reflex camera is described in the above-mentioned embodiment, but the invention may also be applied similarly to a reflex camera.

EXPLANATION OF REFERENCES

1: digital camera
2: lens
2a: lens drive unit
10: camera body
12: lens mount
14: main-display
16: sub-display
16A: sub-display
18: electronic view finder
20: hot shoe
22: grip
24: thumb rest
30: shutter button
31: power supply lever
34: playback button
35: delete button
36: AF lock button
37: AE lock button
38: menu button
39: selector button
40: BACK button
41: rear command dial
50: image sensor
52: image sensor drive unit
54: shutter
56: shutter drive unit
58: analog signal processing section
60: image data input unit
62: work memory
64: data memory
66: digital signal processing section
68: recording control unit
70: main-display drive unit
72: sub-display drive unit
74: operation unit
78: memory card
80: system controller
110: operation dial
112: inner peripheral part
112A: support part
114: outer peripheral part
114A: shaft portion
116: operation dial support frame
116A: click ball-receiving hole
118: bearing
120: click mechanism 120A: click groove-metal plate
120B: click ball
120C: click spring
120a: click groove
126: rotation detection unit
130: touch sensor
132: dial-display
150: exposure mode setting unit
152: operation target setting unit
154: setting change unit
156: dial-display control unit
158: sub-display display control unit
160: dial-display drive unit
L: optical axis
Dz1: first display region
Dz2: second display region
JP: contact detection position
TP: contact detection region
Tz: contact detectable region
Tz1: first region
Tz2: second region
Tz3: third region
Z1: first contact detection region
Z2: second contact detection region
i1: shutter speed information
i2: F-number information
i3: ISO sensitivity information
i4: exposure correction amount information
i5: exposure mode information
m1: mark
m2: mark
S11-S16: procedure of setting processing of exposure mode

What is claimed is:

1. A camera comprising:
a rotary operation dial;
a contact detection unit that detects contact of a finger with a top surface of the operation dial and a contact position of the finger on the top surface of the operation dial;
a first storage unit that stores information on a mode to be set in a case where the contact is detected by the contact detection unit and stores the information on the mode to be set for each of a plurality of regions set on the top surface of the operation dial;
a mode setting unit that sets the mode based on the information stored in the first storage unit and a detection result of the contact detection unit;
a second storage unit that stores information in which an operation target of the operation dial is set for each mode; and
an operation target setting unit that sets the operation target of the operation dial based on the information stored in the second storage unit and the mode set by the mode setting unit.

2. The camera according to claim 1,
wherein the contact detection unit further detects a movement and a movement direction of the finger whose contact is detected, and
wherein the first storage unit further stores information on a mode to be set in a case where the movement of the finger is detected and stores the information on the mode to be set for each movement direction.

3. A camera comprising:
a rotary operation dial;
a contact detection unit that detects a movement and a movement direction of a finger touching a top surface of the operation dial;
a first storage unit that stores information on a mode to be set in a case where the movement of the finger is detected by the contact detection unit and stores the information on the mode to be set for each movement direction;
a mode setting unit that sets the mode based on the information stored in the first storage unit and a detection result of the contact detection unit;
a second storage unit that stores information in which an operation target of the operation dial is set for each mode; and
an operation target setting unit that sets the operation target of the operation dial based on the information stored in the second storage unit and the mode set by the mode setting unit.

4. A camera comprising:
a rotary operation dial;
a contact detection unit that individually detects contact with a plurality of contact detection regions to be set on a top surface of the operation dial;
a first storage unit that stores information on a mode to be set in a case where each contact detection region is touched alone;
a mode setting unit that sets the mode based on the information stored in the first storage unit and a detection result of the contact detection unit;
a second storage unit that stores information in which an operation target of the operation dial is set for each mode; and
an operation target setting unit that sets the operation target of the operation dial based on the information stored in the second storage unit and the mode set by the mode setting unit.

5. The camera according to claim 4,
wherein the first storage unit further stores information on a mode to be set by default.

6. The camera according to claim 4,
wherein the first storage unit further stores information on a mode to be set in a case where the plurality of contact detection regions are simultaneously touched.

7. The camera according to claim 5,
wherein at least a first contact detection region and a second contact detection region are set on the top surface of the operation dial,
wherein the contact detection unit individually detects contact with at least the first contact detection region and the second contact detection region,
wherein the first storage unit stores that a mode to be set in a case where the first contact detection region is touched alone is a shutter speed priority mode and a mode to be set in a case where the second contact detection region is touched alone is an aperture priority mode, and
wherein the second storage unit stores that the operation target of the operation dial in a case where the shutter speed priority mode is set is a shutter speed and the operation target of the operation dial in a case where the aperture priority mode is set is an F-number.

8. The camera according to claim 7,
wherein the first storage unit further stores that the mode to be set by default is a program mode, and wherein the second storage unit further stores that the operation target of the operation dial in the case where the program mode is set is program shift.

9. The camera according to claim 7,
wherein the first storage unit further stores that a mode to be set in a case where the first contact detection region and the second contact detection region are simultaneously touched is a manual mode, and
wherein the second storage unit further stores that the operation target of the operation dial in the case where the manual mode is set is the F-number or the shutter speed.

10. The camera according to claim 4,
wherein the information on the operation target of the operation dial to be set in the case where each contact detection region is touched alone is displayed for each contact detection region on the top surface of the operation dial.

11. The camera according to claim 4, further comprising:
a dial display section provided on the top surface of the operation dial; and
a dial display control unit that controls a display on the dial display section,
wherein the dial display control unit displays the information on the operation target of the operation dial to be set in the case where each contact detection region is touched alone for each contact detection region.

12. The camera according to claim 11,
wherein the dial display control unit changes a display form of the dial display section according to a set mode.

13. The camera according to claim 4, further comprising:
a setting display section; and
a setting display control unit that controls a display on the setting display section,
wherein the setting display control unit displays at least information on a mode to be set by the mode setting unit on the setting display section.

14. A setting method of a camera according to claim 1, comprising:
detecting contact of a finger with a top surface of a rotary operation dial and a contact position of the finger on the top surface of the operation dial;
setting a mode based on information on a mode to be set in a case where the contact of the finger with the top surface of the operation dial is detected and a mode set for each of a plurality of regions set on the top surface of the operation dial and a detection result of the contact of the finger with the top surface of the operation dial; and
setting an operation target of the operation dial based on information in which the operation target of the operation dial is set for each mode and the set mode.

15. A setting method of a camera according to claim 3, comprising:
detecting a movement and a movement direction of a finger touching a top surface of a rotary operation dial;
setting a mode based on information on a mode to be set in a case where the movement of the finger touching the top surface of the operation dial is detected and a mode set for each movement direction and a detection result of the movement of the finger on the top surface of the operation dial; and
setting an operation target of the operation dial based on information in which the operation target of the operation dial is set for each mode and the set mode.

16. A setting method of a camera according to claim 4, comprising:
individually detecting contact with a plurality of contact detection regions to be set on a top surface of a rotary operation dial;
setting a mode based on information on a mode to be set in a case where each contact detection region is touched alone and a detection result of the contact with the contact detection region; and
setting an operation target of the operation dial based on information in which the operation target of the operation dial is set for each mode and the set mode.

17. A non-transitory computer readable recording medium storing a setting program of a camera according to claim 1 causing a computer to realize:
setting a mode based on a detection result of a contact detection unit that detects contact of a finger with a top surface of a rotary operation dial and a contact position of the finger on the top surface of the operation dial and information on a mode to be set in a case where the contact of the finger with the top surface of the operation dial is detected and a mode set for each of a plurality of regions set on the top surface of the operation dial; and
setting an operation target of the operation dial based on information in which the operation target of the operation dial is set for each mode and the set mode.

18. A non-transitory computer readable recording medium storing a setting program of a camera according to claim 3 causing a computer to realize:
setting a mode based on a detection result of a contact detection unit that detects a movement and a movement direction of a finger touching a top surface of a rotary operation dial and information on a mode to be set in a case where the movement of the finger touching the top surface of the operation dial is detected and a mode set for each movement direction; and
setting an operation target of the operation dial based on information in which the operation target of the operation dial is set for each mode and the set mode.

19. A non-transitory computer readable recording medium storing a setting program of a camera according to claim 4 causing a computer to realize:
setting a mode based on a detection result of a contact detection unit that individually detects contact with a plurality of contact detection regions to be set on a top surface of a rotary operation dial and information on a mode to be set in a case where each of the contact detection regions is touched alone; and
setting an operation target of the operation dial based on information in which the operation target of the operation dial is set for each mode and the set mode.

* * * * *